United States Patent

Billington et al.

(10) Patent No.: US 6,856,281 B2
(45) Date of Patent: Feb. 15, 2005

(54) METHOD AND SYSTEM FOR CALIBRATION OF A PHASE-BASED SENSING SYSTEM

(75) Inventors: Scott Alexander Billington, Atlanta, GA (US); Jonathan Lee Geisheimer, Mableton, GA (US)

(73) Assignee: Radatec, Inc., Atlanta, GA (US)

( * ) Notice: Subject to any disclaimer, the term of this patent is extended or adjusted under 35 U.S.C. 154(b) by 0 days.

(21) Appl. No.: 10/716,087

(22) Filed: Nov. 18, 2003

(65) Prior Publication Data

US 2004/0196177 A1 Oct. 7, 2004

Related U.S. Application Data

(60) Provisional application No. 60/427,684, filed on Nov. 19, 2002.

(51) Int. Cl.[7] .............................. G01S 7/40; G01S 13/08
(52) U.S. Cl. ..................... 342/174; 342/118; 342/124
(58) Field of Search ........................ 342/90, 104, 109, 342/118, 124, 147, 165, 174, 194–196, 205

(56) References Cited

U.S. PATENT DOCUMENTS

| | | | | |
|---|---|---|---|---|
| 3,769,585 A | * | 10/1973 | Fremouw et al. | ........... 342/386 |
| RE31,509 E | * | 1/1984 | Neidell | ........... 342/108 |
| 4,847,623 A | * | 7/1989 | Jean et al. | ........... 342/124 |
| 5,406,842 A | * | 4/1995 | Locke | ........... 73/290 R |
| 5,606,324 A | * | 2/1997 | Justice et al. | ........... 342/62 |
| 5,661,490 A | * | 8/1997 | McEwan | ........... 342/387 |
| 6,489,917 B2 | | 12/2002 | Geisheimer et al. | |

FOREIGN PATENT DOCUMENTS

WO    WO 02/44751 A1    6/2002

\* cited by examiner

*Primary Examiner*—Thomas H. Tarcza
*Assistant Examiner*—Isam Alsomiri
(74) *Attorney, Agent, or Firm*—King & Spalding LLP

(57) ABSTRACT

Calibrating the measurement of a distance between a transceiver and an object such as a radiating element (antenna) or a target by continuously changing the wavelength (frequency) of the transmitted wave and observing the rate of phase shift as a function of change in wavelength. The rate of phase shift change as a function of wavelength can be mathematically related to the total displacement to the reflecting object. This calibration technique is applicable to a sensing device comprising a transceiver configured to transmit a signal toward an object, detectors offset in phase to receive the transmitted signal and a reflected signal, and a processor configured with logic to measure a rate of phase shift proportional to the change in wavelength between the transmitted signal and the reflected signal at the detectors. The processor can be further configured with logic to relate the phase shift to displacement between the transceiver and the reflecting object.

18 Claims, 15 Drawing Sheets

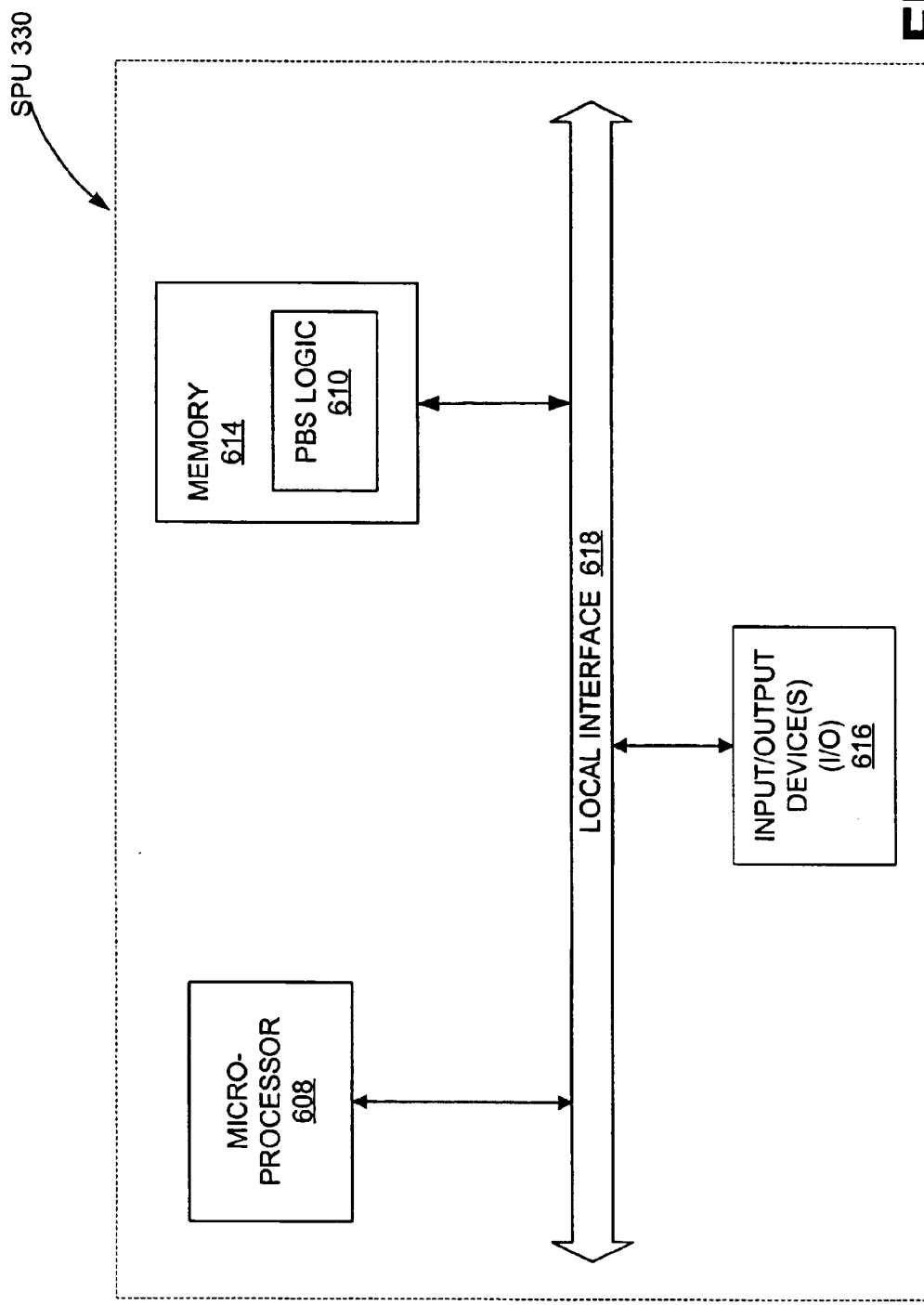

METHOD AND SYSTEM FOR CALIBRATION OF A PHASE-BASED SENSING SYSTEM

CROSS-REFERENCE TO RELATED APPLICATION

This application claims priority to and the benefit of the filing date of U.S. provisional application, Ser. No. 60/427,684, entitled, "Absolute Displacement Calibration for a Phase-Based Radar Vibration Sensor," filed Nov. 19, 2002, which is entirely incorporated herein by reference.

TECHNICAL FIELD

The present invention generally relates to the calibration of sensing systems and, more particularly, to the calibration of non-contact sensing systems, such as phase-based radar systems.

BACKGROUND OF THE INVENTION

Sensing systems are employed for a wide variety of purposes and in diverse fields. There are sensing systems for detecting motion, surface irregularities, environmental conditions, and for physiological conditions, to name a few. Applications can be used in such industries as medical, process, aeronautical, and others. Such diversity in purpose and industry results in a multitude of considerations for the designer or user of the sensing system. These considerations include cost, precision, linearity, measurement range, durability, maintenance requirements, and even the physical characteristics of the sensed object, among others.

Non-contact, or non-invasive, sensing systems are sensing systems that, unlike direct contact sensing systems, do not require the sensing portion (e.g., sensor) to physically contact (directly or through an intermediary) the sensed, or targeted object. Non-contact sensing systems offer many advantages over traditional direct contact sensing systems, such as the ability to provide information regarding an object and/or condition of interest without expensive and invasive sensor mounting assemblies. Non-contact systems, unlike contact systems, also have the advantage of not changing the system they are measuring.

Radar systems using microwave energy are an example of one non-invasive sensing system. Radar systems use reflected electromagnetic waves, typically on the order of 0.9–100 gigahertz (GHz) to determine the presence, location, and speed of sensed objects. Continuous wave microwave techniques are non-contact, relatively inexpensive, and provide a sensing mechanism that is relatively unaffected by dust, debris, rain, and many other obscurants when the proper transmit frequencies are used. Another advantage of using microwaves is that the electromagnetic waves can be guided to the target to be measured; through mediums such as waveguide, circuit board, or coaxial cable. By having the microwave electronics at a distance away from the target, the electronics can be kept in a more environmentally controlled area, such as an enclosure, while the electromagnetic waves can be guided through the transmission medium to measure objects in less hospitable environments.

One disadvantage of using this microwave sensing technique is that the propagation medium used to guide the electromagnetic waves to the target contains metal, which can expand and contract in length over changes in temperature. When the coefficient of thermal expansion (CTE) is large, or a long length of transmission media is used, the change in length of the cable, board, or waveguide over temperature can yield significant errors in the displacement measurement. In high temperature environments, such as gas turbine engines, the temperature change of the antenna and transmission medium can change many thousands of degrees, yielding an unacceptable drift in the displacement output due to temperature.

In addition, this microwave sensing technique is only able to provide unambiguous measurements for distances of one-half wavelength or less to the target. If the distance from the transceiver to the target (including the length of the propagation medium) is greater than one-half wavelength, there is an ambiguity as to the number of integral wavelengths to the target. For example, if a target was 10.2 wavelengths from the transceiver, the output of the sensing system would indicate that the distance is 0.2 wavelengths to the target, since prior phase-based techniques only measure phase between 0–360 degrees (one-half wavelength of displacement).

Thus, a heretofore unaddressed need exists in the industry to address the aforementioned deficiencies and inadequacies.

SUMMARY OF THE INVENTION

The present invention provides a calibration technique that enables a sensing system to unambiguously determine the total distance from a transceiver to a target and to track changes in a length of propagation medium between the transceiver and a radiating element (antenna). The calibration technique is applicable to continuous wave, phase-based sensing systems having a transceiver and a radiating element located at a distance away from one another. In typical operating environments, any changes in length of the propagation medium from the transceiver to the radiating element due to temperature or mechanical changes must be accurately measured. This calibration technique is also useful in situations where it desirable to know the total, unambiguous displacement over a distance of multiple wavelengths.

For one aspect of the present invention, a phase-based sensing system comprises a transceiver configured to transmit a signal toward an object, at least a pair of detectors to receive a reference version of the transmitted signal and a reflected signal, and a processor configured with logic to (1) measure a phase shift resulting from the relative motion of the object between the transmitted signal and the reflected signal and (2) relate the phase shift to the relative motion of the object being measured. The change in phase shift is directly proportional to the displacement of the object being measured as well as the transmitted wavelength. Furthermore, the processor can include logic to change the wavelength (frequency) of the transmitted signal though a range of wavelengths, thereby changing the total amount of phase between the transceiver and the target. The distance to either the antenna or the target can be measured by this processor.

When used in conjunction with a narrowband antenna or an antenna with a narrowband filter, the transmitted signal can be set to a frequency within the stopband of the antenna/filter assembly. For this transmission scenario, the signal is reflected off of the antenna and the distance to the antenna is measured. If the frequency is changed and remains within the passband of the antenna, the transmit signal is radiated into the environment and the distance to the target can be measured. As the wavelength of the transmitted signal changes, the total amount of phase length between the transceiver and the antenna/target changes in a manner proportional to the distance between the transmitter and the location of the reflection. This phase change vs. frequency can be mathematically related to the distance between the transceiver and the antenna/target.

The present invention can also be viewed as a calibration method or a method of removing wavelength ambiguity for a phase-based sensing system. The method can generally be viewed as comprising the following steps: sweeping the frequency of a transmitted signal, measuring a phase shift proportional to the distance between a reference version of the transmitted signal and a reflected signal at two or more detectors; and relating the phase shift to the actual distance between the transmitter and the target.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of exemplary embodiments of the present invention. Moreover, in the drawings, reference numerals designate corresponding parts throughout the several views.

FIG. 6 is a block diagram of an exemplary signed processing unit (SPU) constructed in accordance with one embodiment of the present invention.

DETAILED DESCRIPTION OF THE EXEMPLARY EMBODIMENTS

Figure 1:
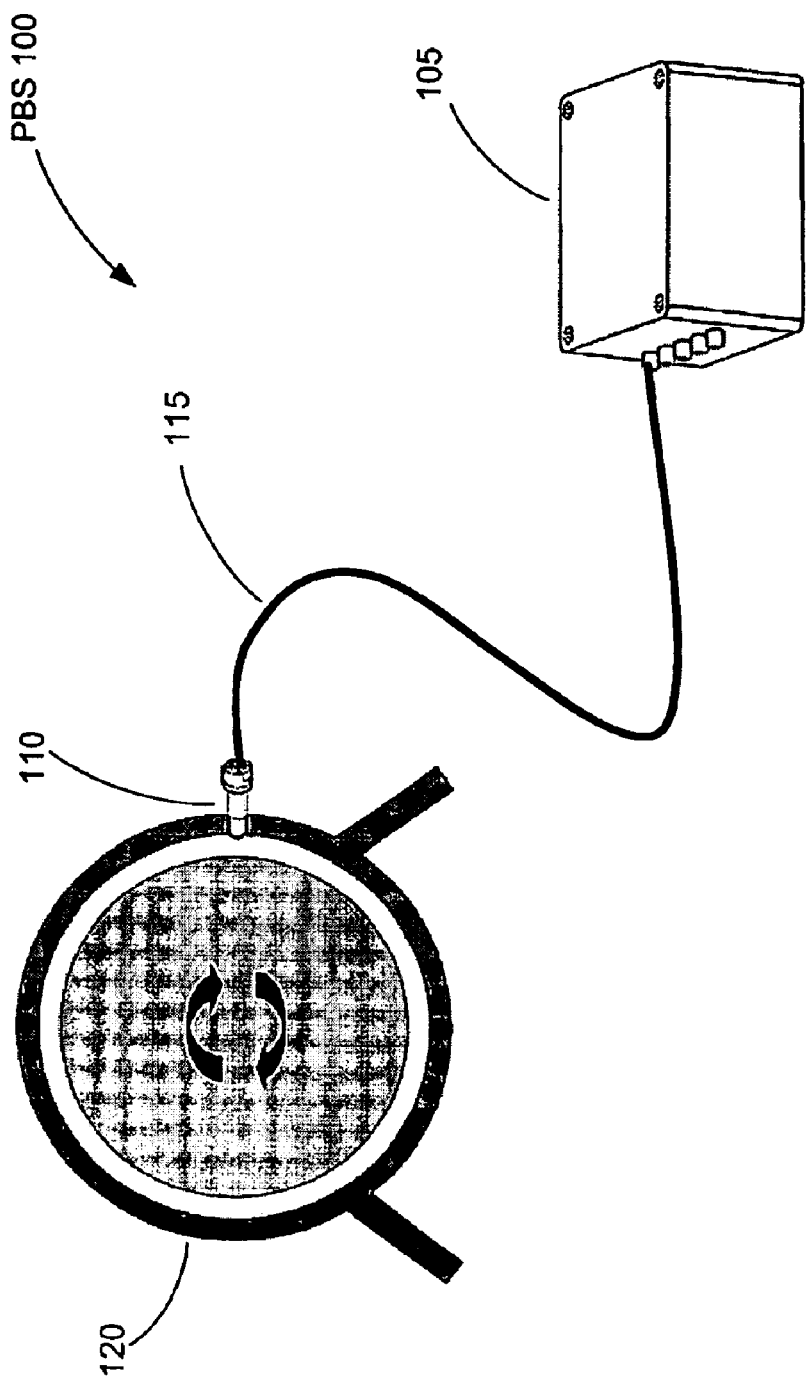
FIG. 1 is a block diagram of an exemplary implementation of a phase-based sensing (PBS) system in a turbine environment.
Figure 2:
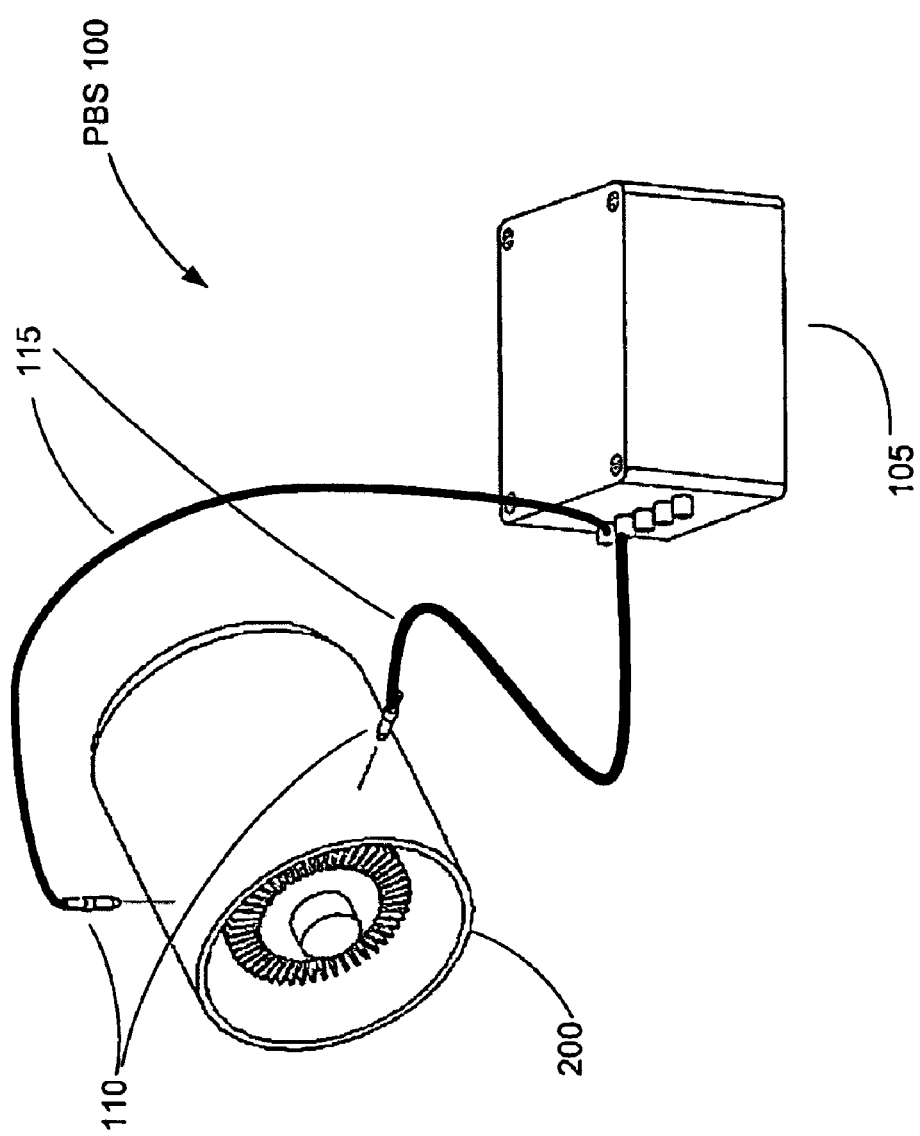
FIG. 2 is a block diagram of an exemplary implementation of a PBS system within a generator environment.
Figure 3:
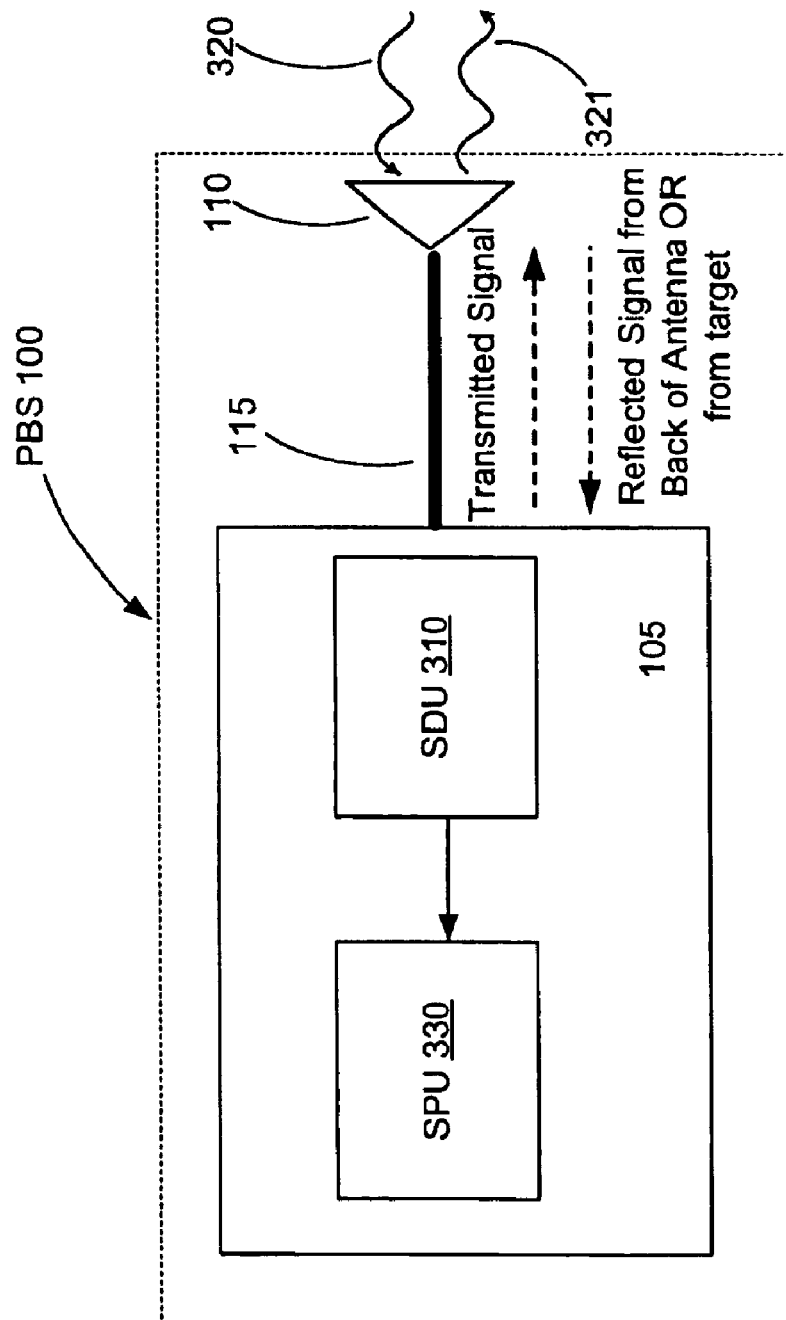
FIG. 3 is a schematic view of an exemplary PBS system constructed in accordance with one embodiment of the present invention.
Figure 8:
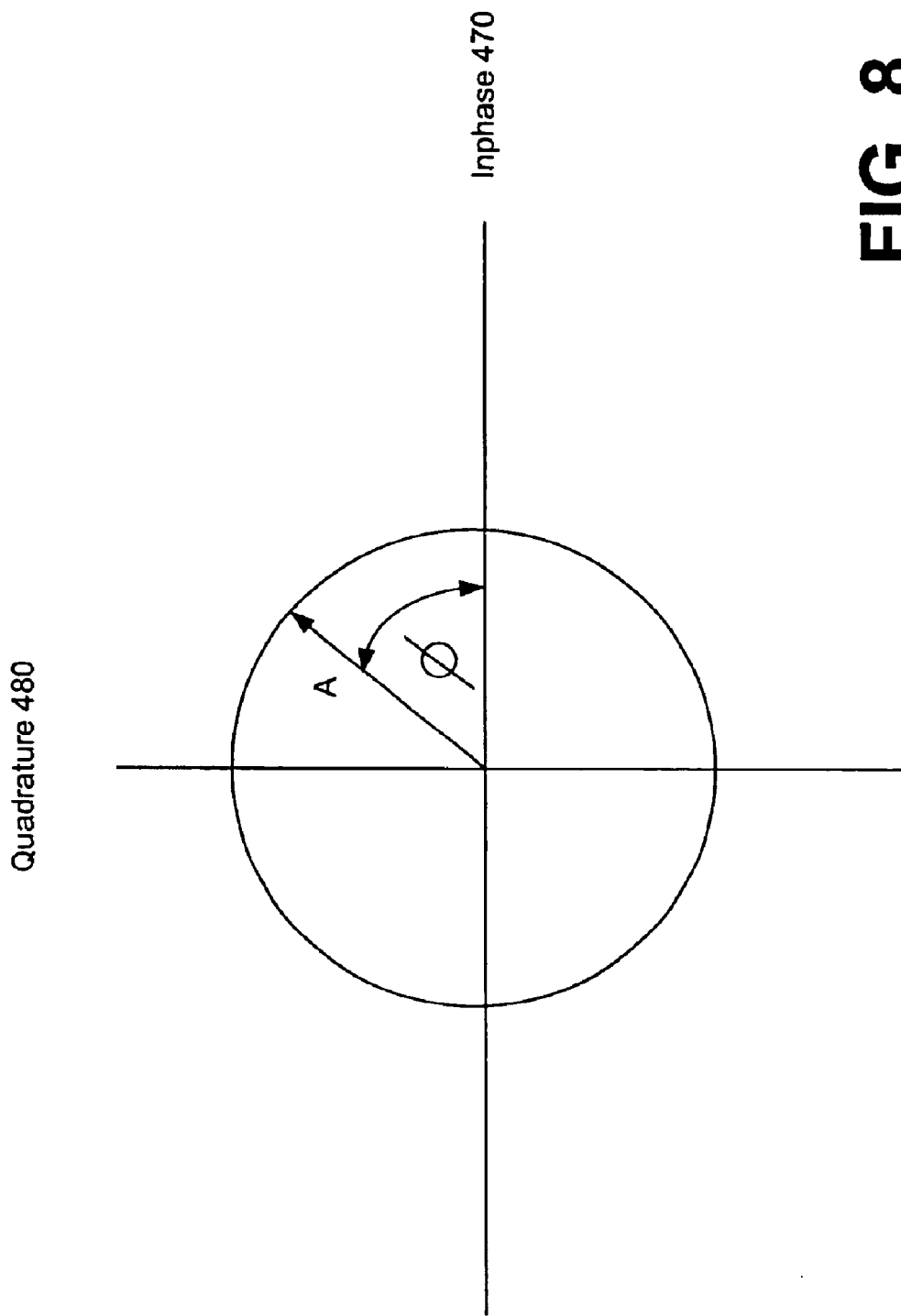
FIG. 8 a representative phasor diagram illustrating inphase and quadrature phase signal outputs of an exemplary SPU for a PBS system constructed in accordance with an exemplary embodiment of the present invention.
Figure 9:
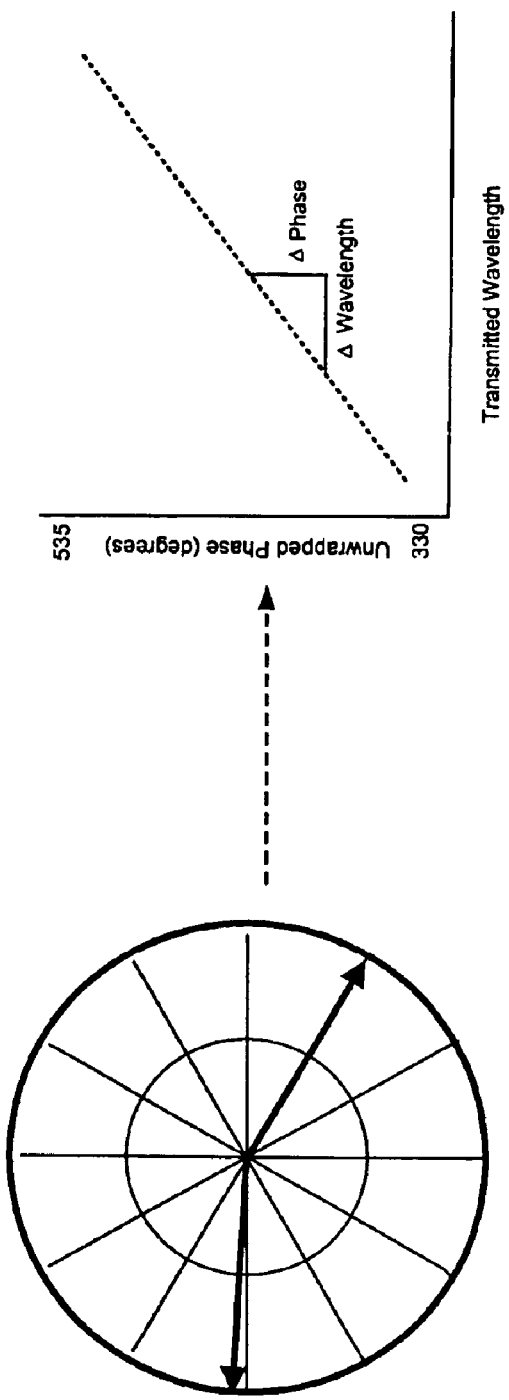
FIG. 9 is a representative phasor diagram displaying a phase versus time plot corresponding to data that is used as an input to a calibration algorithm for an exemplary PBS system constructed in accordance with one embodiment of the present invention.
Figure 10:
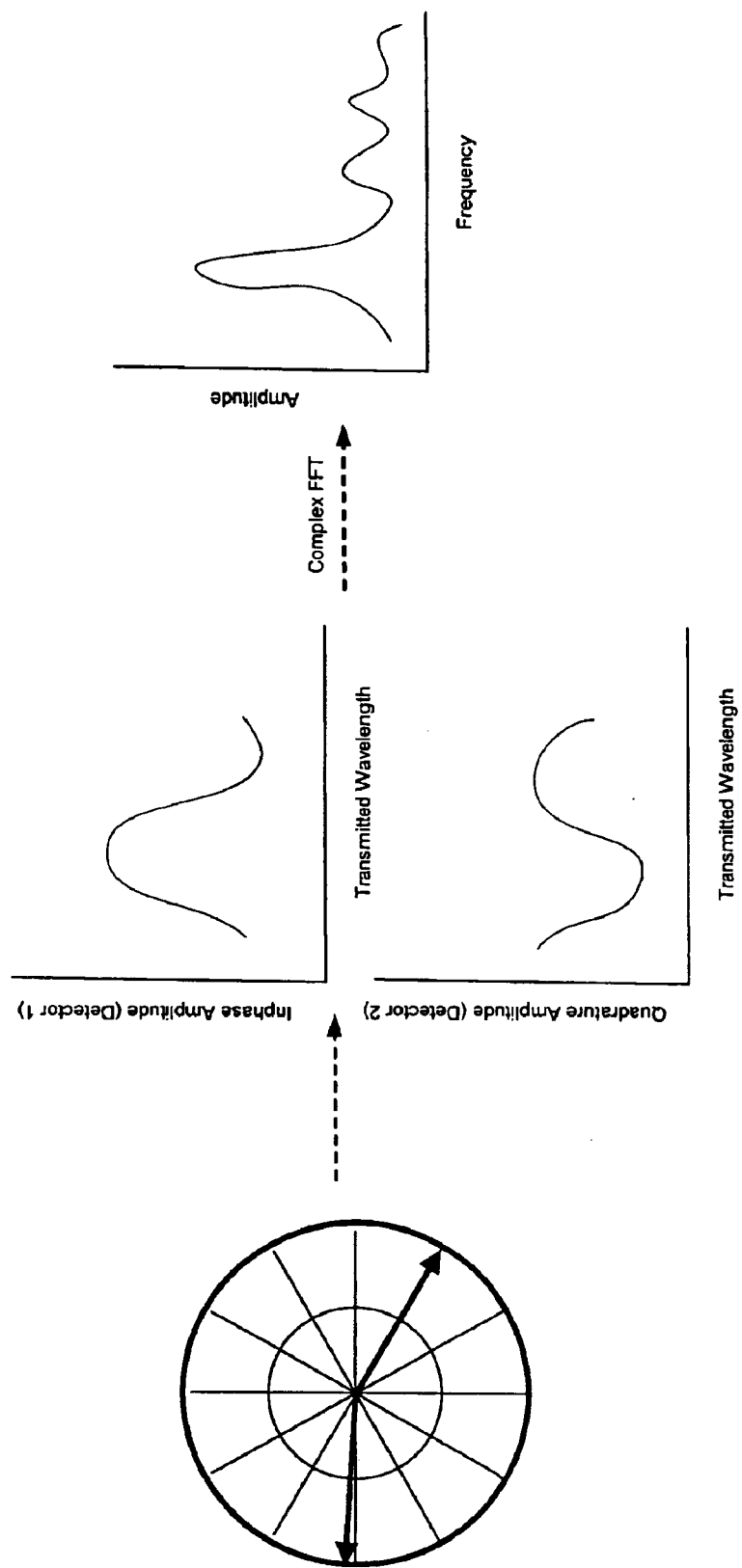
FIG. 10 is an illustration of a representative phasor diagram displaying mixer outputs vs. time for an exemplary PBS system and a diagram showing the mathematical transform of that output mixer data in a time to frequency transformation.
Figure 11:
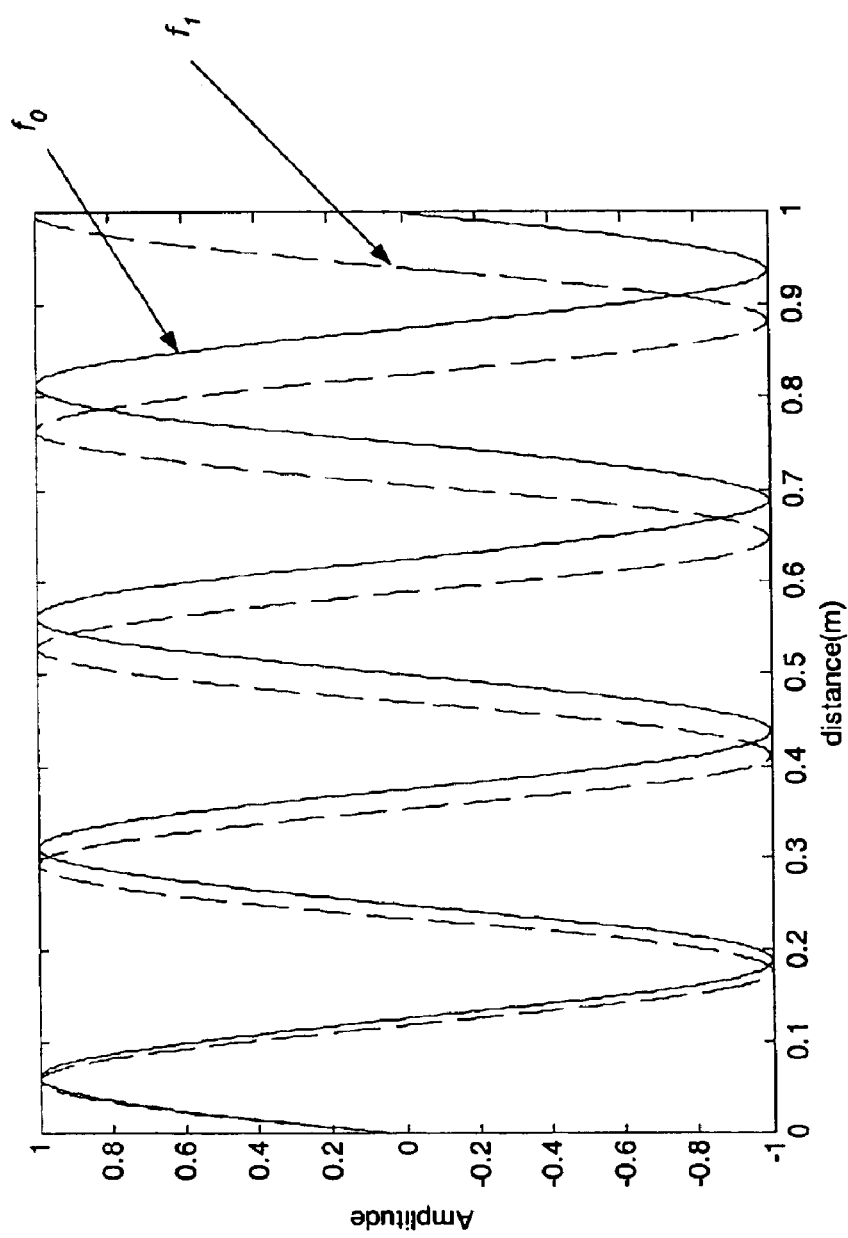
FIG. 11 is a diagram showing a variation in the total number of wavelengths to a target arising from changes in the transmit frequency of an exemplary PBS system.
Figure 12:
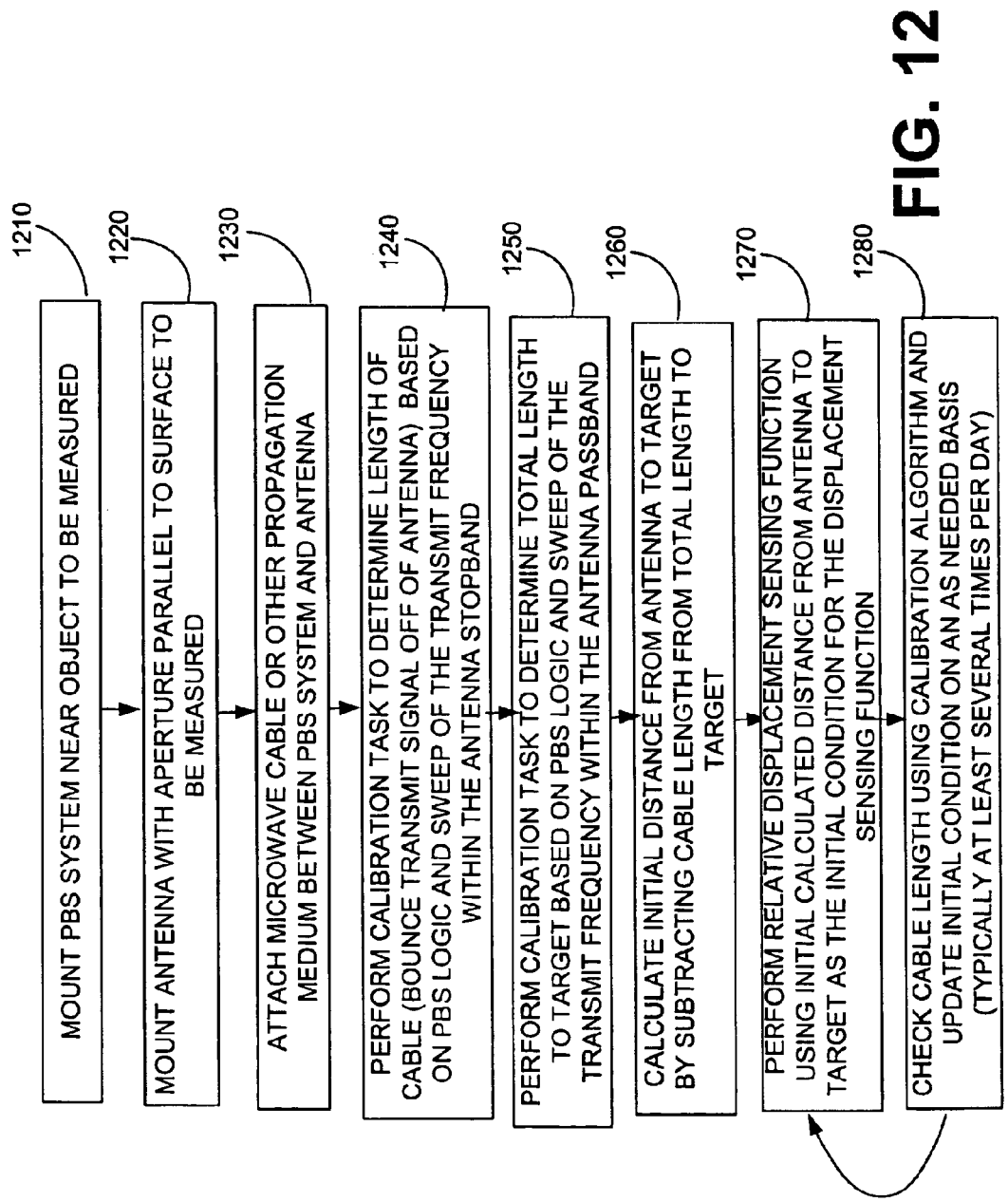
FIG. 12 is a process diagram showing a computer-implemented process for completing initialization, calibration and measurement operations for an exemplary PBS system in accordance with one embodiment of the present invention.
Figure 13:
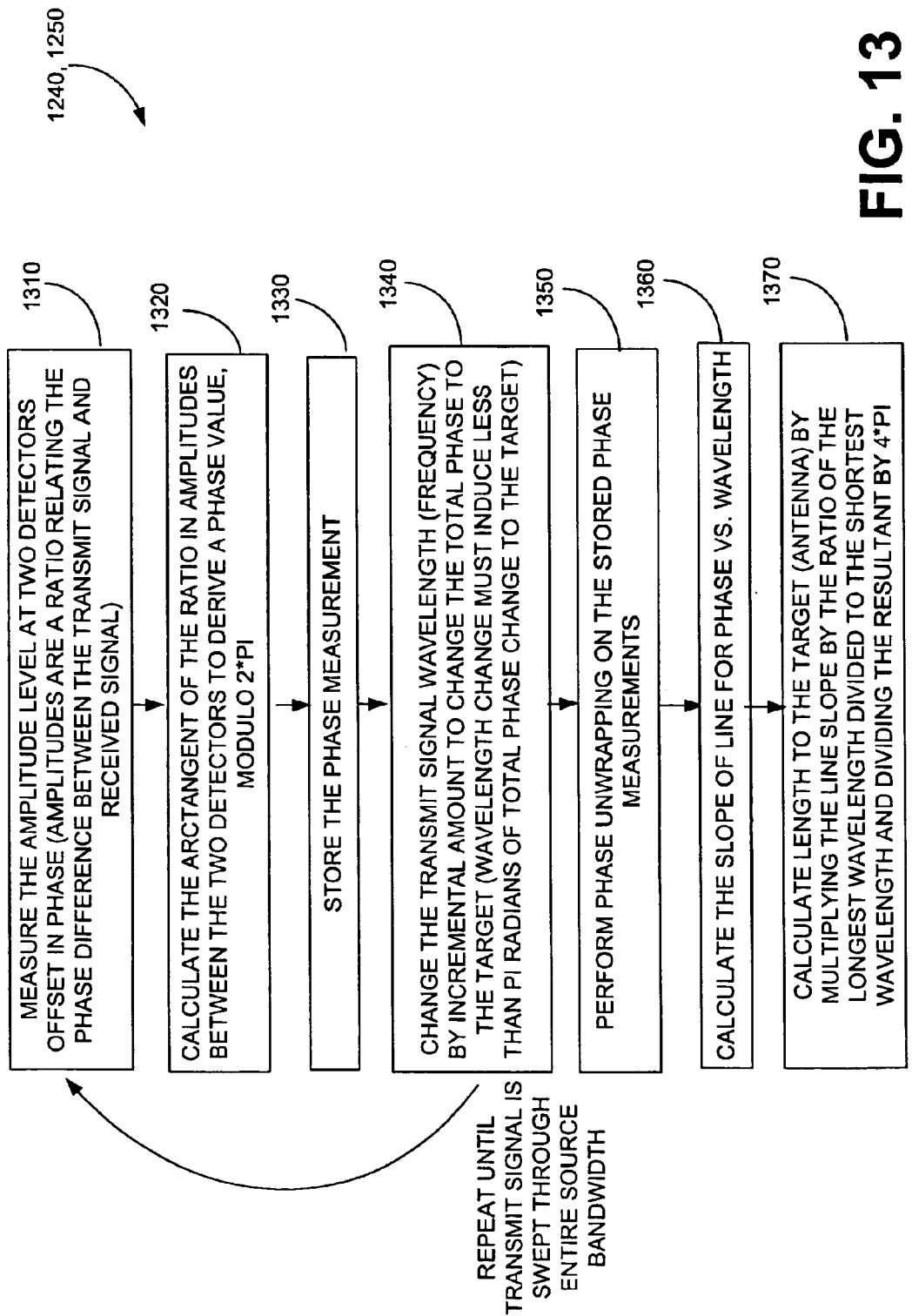
FIG. 13 is a flowchart illustrating an exemplary phase-based calibration process in accordance with one embodiment of the present invention.
Figure 14:
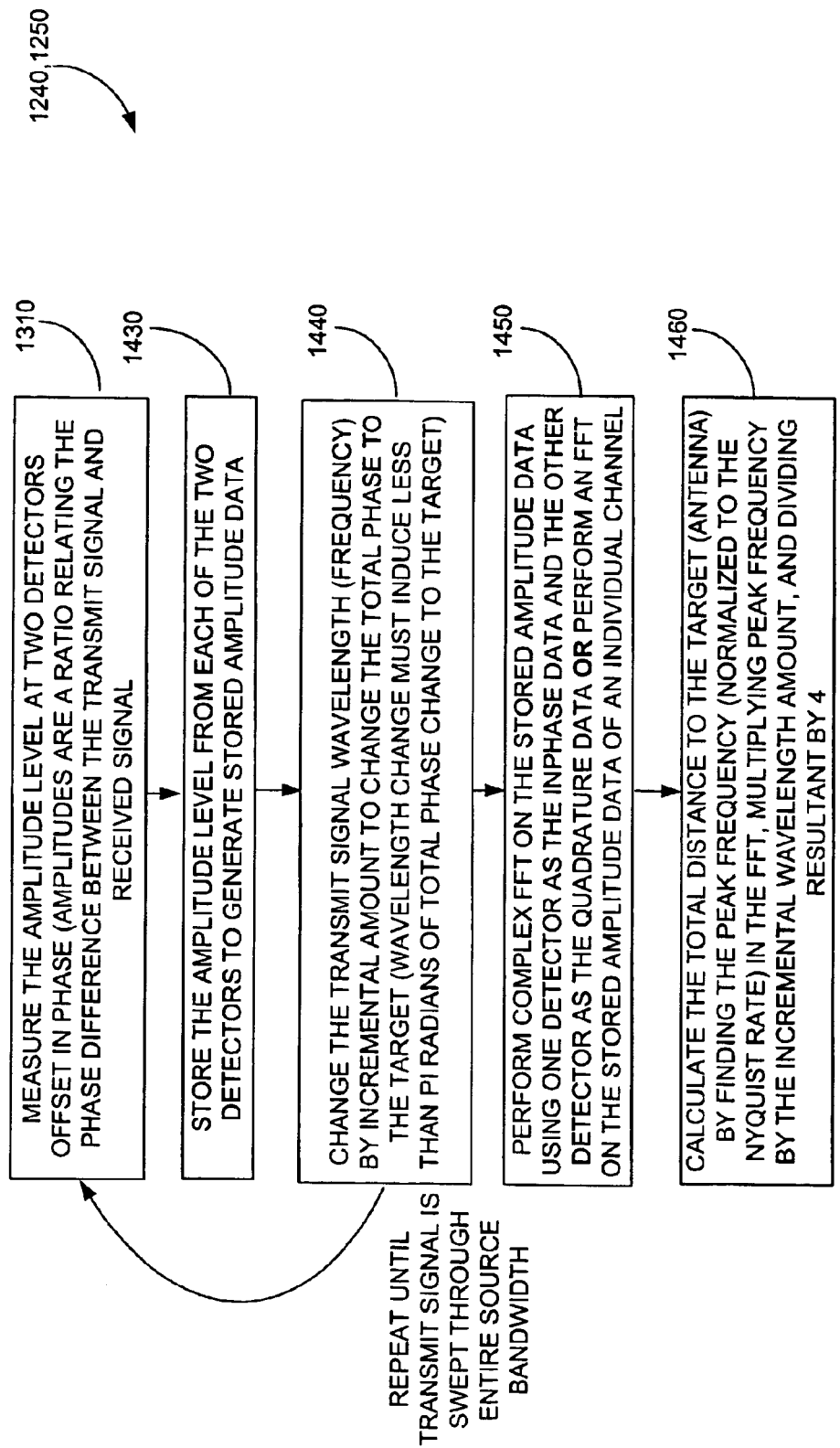
FIG. 14 is a flowchart illustrating an exemplary phase-based calibration process in accordance with an alternative embodiment of the present invention.
Figure 15:
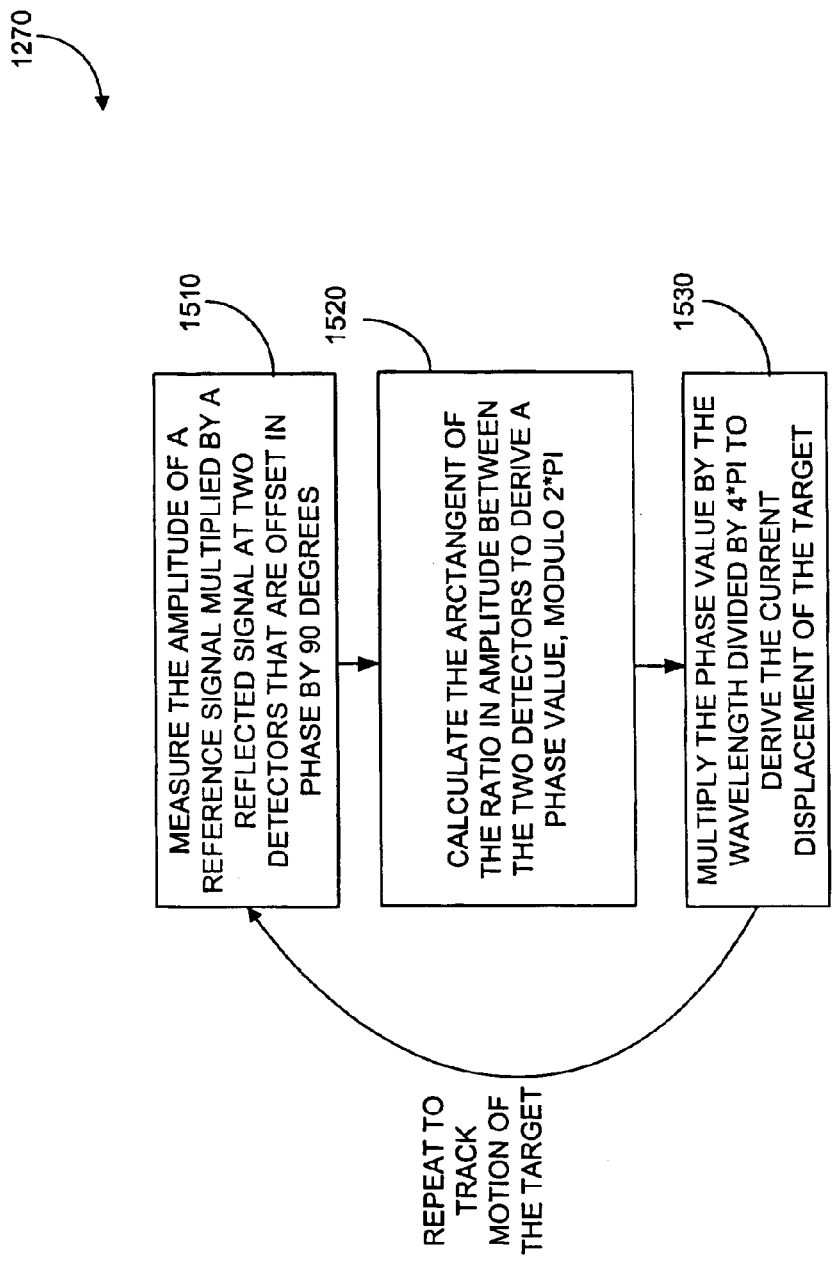
FIG. 15 is a flowchart illustrating an exemplary process for completing a displacement measurement in accordance with an embodiment of the present invention.

Exemplary embodiments of the present invention provide a calibration technique for a phase-based sensing (PBS) system, or sensing system, such as a phase-based radar system The calibration for the PBS system will now be described more fully hereinafter with reference to FIGS. 1–15, in which embodiments of the invention are shown. FIGS. 1–2 provide illustrations of implementations for an exemplary PBS system with calibration functionality. FIG. 3 provides a block diagram of an exemplary PBS system, with components of the PBS system illustrated in more detail in FIGS. 4, 6 and 7. FIGS. 5A and 5B illustrate a typical antenna/filter reflection coefficient and a representative sweep of the transmit frequency during a calibration task. FIGS. 8, 9, and 10 are representative phasor diagrams used to graphically illustrate the mathematical techniques of the calibration task. FIG. 11 represents how a microwave standing wave can be set-up between the transceiver and the antenna/target for two different transmit frequencies. FIG. 12 is a process diagram illustrating representative set-up, calibration and operation tasks for an exemplary PBS system. FIGS. 13 and 14 are flowcharts illustrating alternate calibration methods for an exemplary PBS system. FIG. 15 is a flowchart illustrating an exemplary process of completing a displacement measurement in accordance with an embodiment of the present invention.

Relative motion of a targeted object (i.e., a sensed object or target) will be understood to encompass applications where either the sensed object is moving (such as a machine or machine part) or a cable or waveguide connecting the sensor to the antenna changes in length relative to the fixed PBS system. This invention can, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and among others supported by exemplary embodiments of the present invention.

FIG. 1 is a block diagram of one exemplary implementation of a PBS system. In this example, the PBS system 100 is used for non-contact measurement of rotating machinery, such as the gap between the rotor and stator within a generator. Although illustrated as an integrated single unit with an attached cable and antenna, the PBS system 100 can be in the form of several components in electrical communication with each other, with each component either proximally located or spatially separated throughout the system in which it is used. An electronics system 105 emits an electromagnetic signal through a cable 115, which propagates into an antenna 110 mounted within a hole or other access point in the casing. In other embodiments, cable 115 could be a circular or rectangular waveguide, or any other means of guiding an electromagnetic wave to an antenna. If the phenomenology used was light waves rather than pure electromagnetic waves, then 115 could be a fiber optic cable.

Because a generator could be a land-based unit, such as those used in power generation, or a turbine generator within an aircraft engine, it is not uncommon for the rotating machinery to experience large temperature swings due to changes in ambient air temperature. The gap between the rotor and stator of the generator to be measured for typical monitoring applications of the PBS system often requires resolution down to one-thousandth of an inch (0.001"). Thermal expansion and contraction of cable 115 easily exceeds this value for cable lengths larger than a couple of feet over normal operating conditions. Depending on the installation, the length of cable 115 can extend upwards of thirty feet and the relative change in length due to temperature swings can exceed several tenths of an inch. Therefore, when measurements of less than a tenth of an inch are desired, errors due to temperature changes of the cable can cause significant errors in the measurement and a calibration mode becomes necessary. Any gap or displacement measurement within a machine, rotating or non-rotating, represents a potential application of the exemplary PBS system 100.

Vibrations in the machine that cause rapid changes in the gap between the rotor and stator of the generator represent yet another application of the exemplary PBS system 100. Vibration measurements can be obtained by the PBS system 100 to provide an indicator of the health of rotating or non-rotating machinery using standard vibration analysis algorithms.

FIG. 2 is a block diagram of an implementation of the PBS system 100 within the operating environment of turbine engine 200, where the exemplary system is measuring airfoils as they pass by the sensor. As indicated in FIG. 2, the signal output from the PBS system 100 can be interpreted to provide information about the condition of the blade. For example, a measurement that indicates a blade is closer to the sensor can indicate that a blade is lengthening or loosening from its attachment point. Further, a delayed or early signal relative to the periodicity of the other signals can indicate that a blade is bent or vibrating. This measurement is taken directly, in one implementation, by transmitting signals to the edge of the blade and receiving a reflected signal. This particular system uses two separate probes located 90 degrees from one another to provide a full characterization of rotor dynamics, including gap changes due to machine run-out and bearing whirl.

Turbine engines often have temperatures that can exceed 3000 degrees Fahrenheit. Therefore, the environment in which PBS system 100 operates can cause the probe to see temperatures of several thousand degrees Fahrenheit and the cable temperatures can change by several hundreds of degrees when the system starts from ambient conditions. Therefore, the cable length can change by up to several tenths of an inch under these normal operating conditions and a calibration system is desirable. In general, the PBS system 100 can be used in virtually any sensing application with many different types of antenna or coherent phase transceivers (i.e., a transceiver with a plurality of spatially or electrically separated signal detectors), to enable unprecedented precision measurement in radar-based sensing systems. An example of a system for measurements in turbine engines is described by Geisheimer et al. in U.S. Pat. No. 6,489,917, which is fully incorporated herein by reference.

FIG. 3 is a block diagram of the exemplary sensing system of FIGS. 1–2, in accordance with one embodiment of the invention. The exemplary PBS system 100 comprises a sensor-detecting unit (SDU) 310, a microwave cable or waveguide 115, an antenna 110, and a processing system, or signal processing unit (SPU) 330. Operations of the entire PBS system 100 can be controlled through operating software (not shown) located in the SPU 330, or networked, or integrated with, external control circuitry (not shown) implemented in hardware and software, or a combination of hardware and software. The external control circuitry can coordinate transmitting and receiving functionality of the PBS 100 with the processing functionality.

The exemplary SDU 310 can be a transceiver-type device using transmitting signal sources such as a Gunn oscillator, dielectric resonance oscillator (DRO), YIG oscillator, or other microwave signal generating source, along with a receiver consisting of a diode, mixer, or other phase detection device, among others. The microwave transmitter typically has a varactor diode or other tuning device that allows the transmit frequency to be changed electronically through a control signal such as a voltage or current. The SDU 330 preferably emits microwave signal 321 directed orthogonally at the target object. The reflected microwave signal 320 is received by two mixers in the SDU 310. In other embodiments, a greater number of mixers, alternatively described as detectors, can be used in the SDU 310 to increase the amount of information pertaining to object motion and thus provide, among other benefits, enhanced measurement resolution and signal to noise at the output of the SPU 330. The mixers are spatially separated, preferably separated by 90 degrees, to provide for, in the case of two mixers, an inphase signal (I) and a quadrature signal (Q), as will be described in further detail below. In other embodiments, the mixers can be electrically separated and/or spatially separated.

Normally, the detected signals are forwarded to an exemplary SPU 330, which combines the two signals to produce a single signal that is representative of the displacement, or relative motion, of the targeted object. A two-signal (e.g., I and Q signals) system provides the information to uniquely define (in a mathematical sense) the relative motion related to phase change of the object. Systems with greater than two mixer signals can support an optimal estimate of relative motion. Thus, through phase-modulation mechanisms of the PBS system 100, and not the Doppler effect, the PBS system 100 uses microwaves to measure relative movement (or variation), of the targeted object where the movement can be on the order of the length of the transmitted wave or smaller, or greater. In addition, the transmitted wavelength can be changed, which induces a phase shift in the reflected signal. Depending upon the antenna response and the actual frequency transmitted, the signal may reflect from the target of interest or from the antenna. In either case, it is assumed that the reflecting object does not move while the transmit frequency is being changed.

It will be understood and appreciated by those having ordinary skill in the art that standard signal processing hardware, software, or a combination of hardware and software used for filtering, anti-aliasing, for filtering the output of each of the mixers, and digitizing the outputs before reaching the SPU 330, can be included within the PBS system 100, although not shown.

Figure 4:
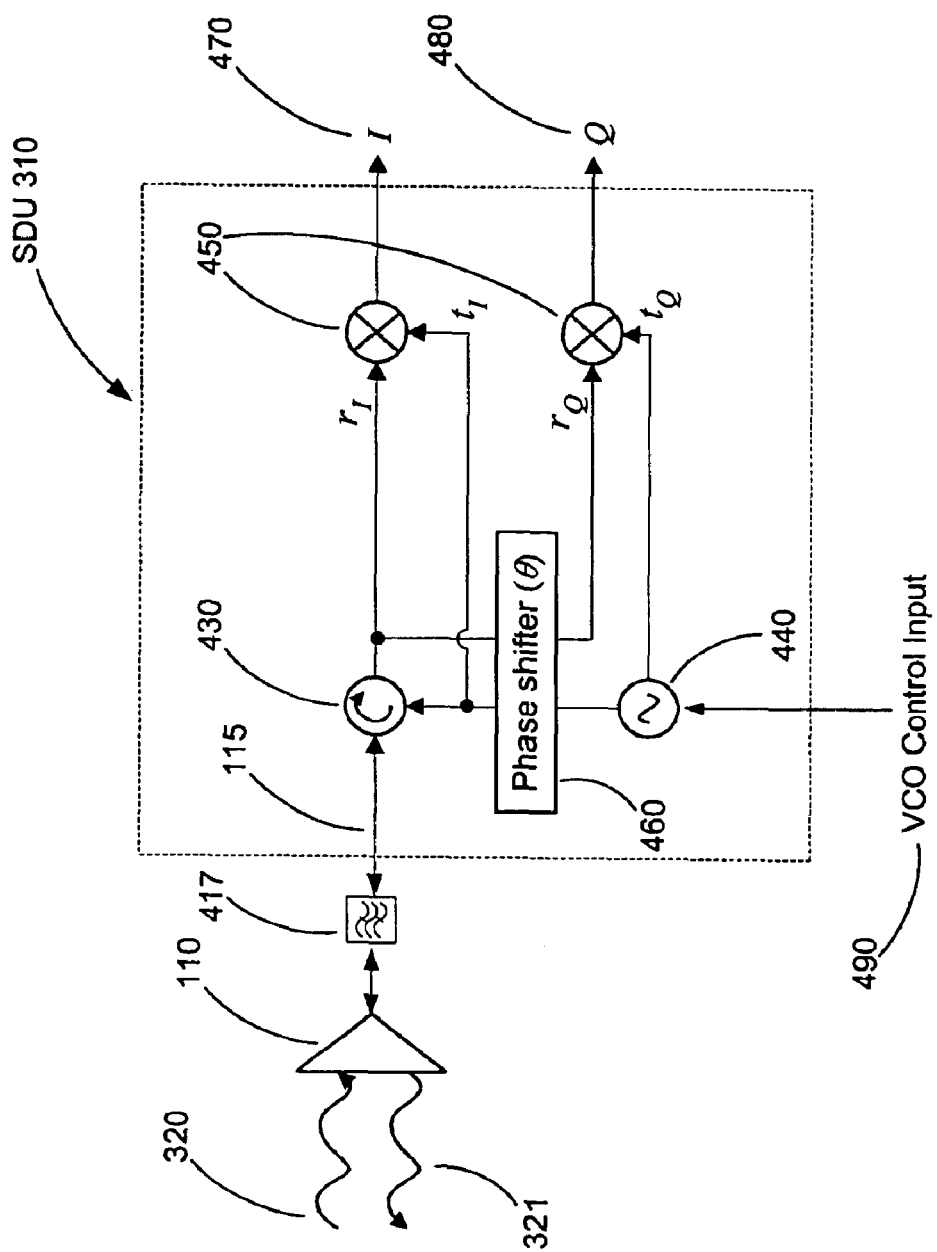
FIG. 4 is a schematic view of an exemplary sensor detection unit (SDU) constructed in accordance with an exemplary combination of the present invention.
Figure 5B:
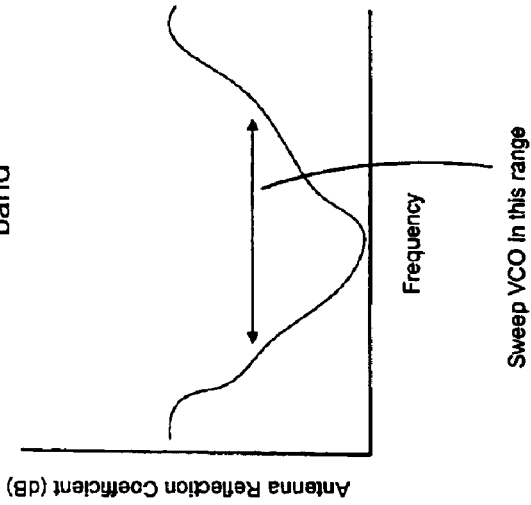
FIGS. 5A and 5B are diagrams showing representative antenna reflection coefficient vs. frequency patterns, as well as typical frequency locations where a transmit signal can be swept, for calibration of cable (or waveguide) length and calibration of a measured distance to a target.
Figure 5A:
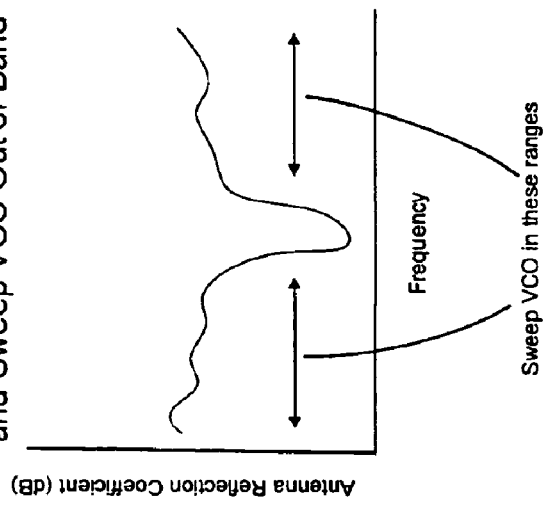

FIG. 4 is a schematic view of the exemplary SDU 310 for the PBS system 100 illustrated in FIG. 3. The exemplary SDU 310 represents a standard fully coherent radar system. The SDU 310 includes a set of mixers 450, alternatively described as detectors, with a preferred electrical separation of 90 degrees apart in phase referenced to the transmitted signal wavelength, and a microwave generating source 440. The generating source 440 is typically a voltage controlled oscillator (VCO) containing a voltage control input able to change the transmit frequency over a range. Source 440 is then split into two signals, one of which is used as the reference signal for mixers 450 and the other which is transmitted as a transmit signal to the antenna via circulator 430. Phase shifter 460 is used to induce 90 degrees of electrical separation between the two mixers. The transmit signal goes to antenna 110 via microwave cable 115. Filter 417 is located at the antenna, and is used to provide an appropriate frequency response to generate a reflected signal. The antenna 110 is selected primarily based on the application. If the calibration to the target is desired, the VCO control voltage 490 is tuned so that the microwave energy radiates out into the air via transmitted signal 321. The energy is then reflected off the target and returns via signal 320 after which the signal is in turn guided by circulator 430 to mixer 450. If the calibration sequence is to be performed to the antenna, VCO control voltage 490 is tuned out of the antenna passband so that the signal reflects off of the antenna or a filter located at the back of the antenna that provides the appropriate frequency response.

The electrical signals output by the mixers represent a superposition of reflected signals from all objects within the beam of the antenna. Although described herein as mixers, other non-linear devices can be used to perform this demodulation. Further, combinations of detector diodes in different configurations can be used for increased sensitivity, such as for example, balanced mixers, double balanced mixers, crystal detectors, Schottky diodes, etc. The outputs of the inphase and quadrature mixers are designated as signals 470 and 480, respectfully. These signals are then passed to signal processing unit SPU 330. By examining the relative phase difference of the vector generated from the in-phase and quadrature phase components, and through the appropriate mathematics, the absolute phase change caused by changing the phase to the reflecting object can be derived, as will be explained later.

It will be understood that exemplary embodiments of the invention are not limited by the choice of SDU 310, and other transceiver-like devices or antennas can be used. Further, although the SDU 310 is shown as integrating the transmitting and receiving portion into a single component, as long as the reference signal emitted from a transmitting device passes to mixers 450, and the reflected signal passes to mixers 450 or other similar devices, the transmitting device can be implemented by a component or device separate from the device that receives the reflected signal.

FIG. 5A shows a typical reflection coefficient response for an antenna/filter combination. The reflection coefficient shows the amount of energy reflected back at a given frequency, and is the standard method of displaying antenna performance as function of frequency. For situations, as in FIG. 5A, where a measurement of the total length from SDU 310 to the back of the antenna is desired, VCO 590 should be varied in such a manner as to transmit at frequencies that cause a large reflection off of the back of the antenna. The frequency response of the antenna is not constant over a typical frequency range, which causes the rate of phase change as a function of frequency change to vary in a somewhat non-linear manner. In this case, the antenna response can be measured a-priori using a network analyzer or other antenna measuring device and the response can be corrected for in the output phase plot using standard techniques. Typical sweep bandwidths vary from several MHz to several hundred MHz depending upon the particular antenna response and tuning range of the microwave source. If the antenna has a sufficient frequency response to reflect enough energy, then a filter located at the antenna may not be necessary. If a wideband antenna is used, then a filter may need to be placed just before the antenna so that a sufficient reflection can be obtained.

FIG. 5B shows a typical reflection coefficient response for an antenna/filter combination that can be used to measure the total displacement to the target of interest, and could be a zoomed-in version of FIG. 5A in the passband response. For situations, as in FIG. 5B, where a measurement of the total length from SDU 310 to the target is desired, VCO 440 should be varied in such a manner as to transmit at frequencies that pass through the antenna and reflect off of a target in front of the antenna. The frequency response of the antenna is not constant over a typical frequency range, which causes the rate of phase change as a function of frequency change not to vary in a somewhat non-linear manner. In this case, the antenna response can be measured a-priori using a network analyzer or other antenna measuring device and the response can be corrected for in the output phase plot using standard techniques. Typical sweep bandwidths vary from several MHz to several hundred MHz depending upon the particular antenna response and tuning range of the microwave source.

Figure 7:
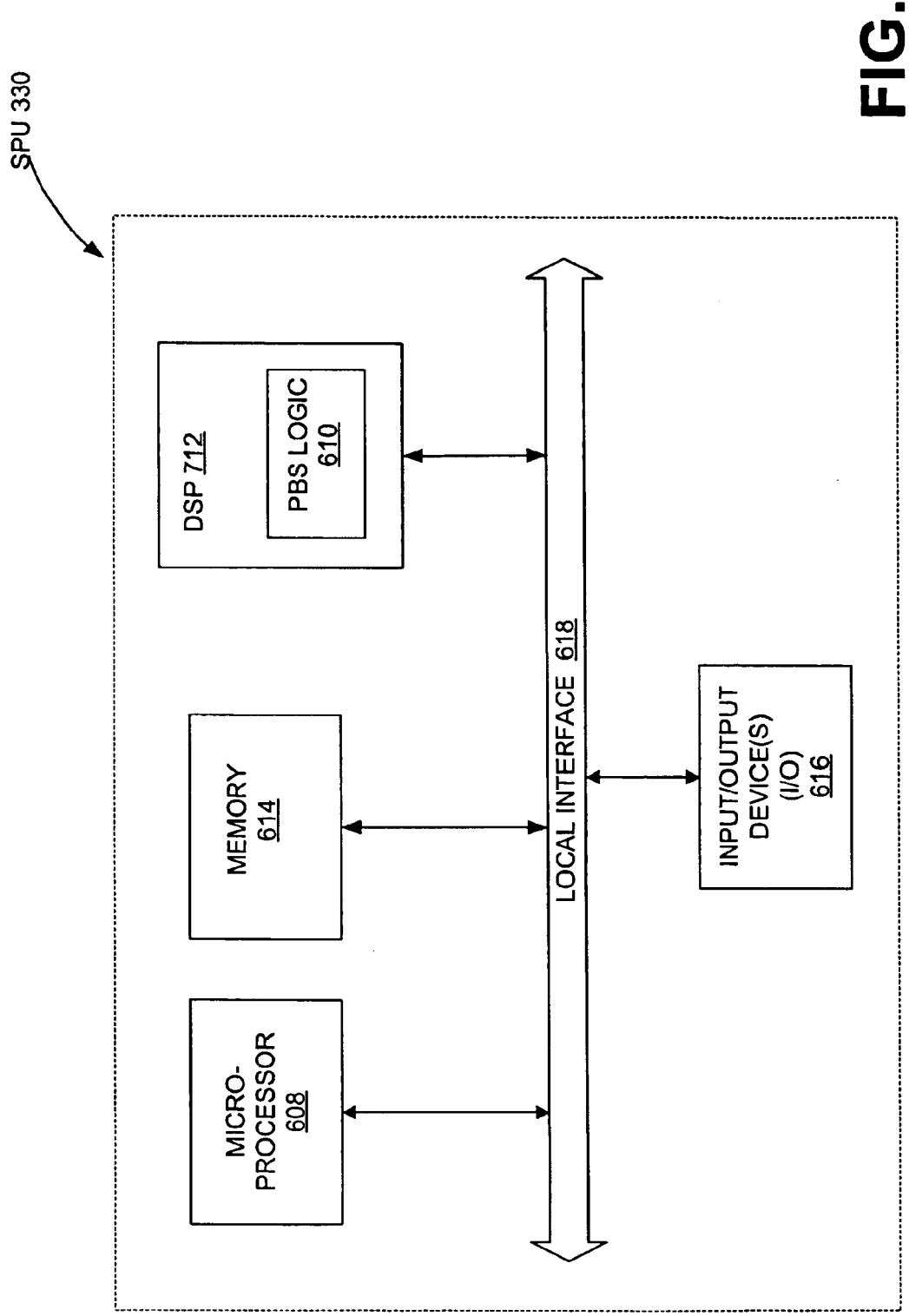
FIG. 7 is a block diagram of an exemplary SPU constructed in accordance with another embodiment of the present invention.

FIGS. 6 and 7 are block diagrams of an exemplary SPU 330 (FIG. 3) of the PBS system 100, in accordance with alternate embodiments of the invention. The SPU 330 can be implemented as a combination of hardware and software, but is preferably implemented in software. SPU 330 is one component of the hardware contained within 105. Generally, in terms of architecture, as shown in FIG. 6 and FIG. 7, the SPU 330 includes a processor 608, memory 614, and one or more input and/or output (I/O) devices 616 (or peripherals) that are communicatively coupled via a local interface 618 to receive the output signals, or conditioned output signals from mixers 450 in the SDU 310, and relay a displacement signal to another device. The microprocessor 608 is a hardware device for executing software, particularly that stored in memory 614. The microprocessor 608 can be any custom made or commercially available processor, a central processing unit (CPU), an auxiliary processor among several processors associated with the PBS logic 610, a semiconductor-based microprocessor (in the form of a microchip or chip set), or generally any device for executing software instructions. Exemplary PBS logic 610 comprises the necessary instructions and mathematical equations to perform both displacement measurements and calibration tasks based on I channel 470 and Q channel 480 inputs along with knowledge of the current transmitted frequency, based on the VCO control input 490.

Specifically, PBS logic 610 can perform a calibration process comprising the tasks of processing the inphase signal 470 and quadrature signal 480 and calculating a phase value. Then, through a control signal, the PBS logic 610 can change the VCO control input 490 to change the transmitted wavelength. Next, the PBS logic 610 measures the phase value from inphase signal 470 and quadrature signal 480 again. Finally, the rate of phase change can be mathematically related to the desired calibration distance by multiplying the phase change value by an appropriate constant.

When not in calibration mode, PBS logic 610 can accept the inphase signal 470 and quadrature signal 480 and continuously calculate the distance to the target.

Other components, not shown, may include other processing components such as analog to digital converters, filters, etc. The local interface 618 can be, for example but not limited to, one or more buses or other wired or wireless connections, as is known in the art. The local interface 618 may have additional elements, which are omitted for simplicity, such as controllers, buffers (caches), drivers, repeaters, and receivers, to enable communications. Further, the local interface may include address, control, and/or data connections to enable appropriate communications among the aforementioned components. I/O devices 616 may include devices that communicate both inputs and outputs, for instance but not limited to, a modulator/demodulator (modem; for accessing another device, system, or network), a radio frequency (RF) or other transceiver, a telephonic interface, a bridge, a router, etc.

FIG. 6 illustrates an embodiment in which the PBS logic 610 is embodied as programming structure in memory 614, as will be described below. The memory 614 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 614 may incorporate electronic, magnetic, optical, and/or other types of storage media. The memory 614 can have a distributed architecture, where various components are situated remote from one another, but can be accessed by the microprocessor 608.

In the implementation shown in FIG. 6, the software in memory 614 can include PBS logic 610, which provides executable instructions for implementing the phase-shift-to-displacement signal functionality as well as instructions for implementing the calibration algorithm. The software in memory 614 may also include one or more separate programs, each of which comprises an ordered listing of executable instructions for implementing logical functions and operating system functions such as controlling the execution of other computer programs, providing scheduling, input-output control, file and data management, memory management, and communication control and related services. When the SPU 330 is in operation, the microprocessor 608 is configured to execute software stored within the memory 614, to communicate data to and from the memory 614, and to generally control operations of the PBS system 100 pursuant to the software.

When the PBS logic 610 is implemented in software, it should be noted that the PBS logic 610 can be stored on any computer readable medium for use by or in connection with any computer-related system or method. In the context of this document, a computer readable medium is an electronic, magnetic, optical, or other physical device or means that can contain or store a computer program for use by or in connection with a computer related system or method. The PBS logic 610 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

A "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the PBS logic 610 is implemented in hardware, the PBS logic 610 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

FIG. 7 describes another embodiment, in which the PBS logic 610 is implemented as logic structured within the digital signal processor (DSP) 712. The DSP 712 can be custom made or a commercially available DSP, running the PBS logic 610 alone or in combination with the microprocessor 608.

FIG. 8 shows a phasor diagram containing two axes, the I (inphase) axis and the Q (quadrature) axis. The phasor represents the combination of the baseband mixer in-phase and quadrature channel signals. Therefore, the output of each mixer 470 and 480 is the end result of the multiplication of the reference signal and received signal, as is done in standard radar and communication systems that perform a demodulation process. The total length of the phasor is the magnitude (square root of the sum of the squares) of the two signals. Thus, the length of the phasor, A, is proportional to the reflected energy (radar cross section) of the object being sensed (i.e. the sensed or targeted object). The relative phase of the phasor, $\phi$, on the diagram is a function of the distance between the targeted object and the mixers and the transmitted frequency. The voltage of both the I and Q channel signals can change by at least one of three ways: (1) changes in radar cross section, which cause the length of the phasor to change, (2) the object moves (causing the phasor to rotate on the diagram), or (3) the transmit frequency is changed causing the total amount of phase to the object to change.

The phasor diagram can be represented algorithmically, or mathematically, in the logic of the SPU 330 (FIG. 3), as will be described. In the PBS system 100, the total length of the vector signal, A, represents the amount of microwave energy being reflected back from the object of interest. The more energy that is reflected, the longer the length of A. The phase, $\phi$, is the distance to the object in degrees modulo 360°. For example, if the frequency being used is 24.1 GHz, then the wavelength, $\lambda$, is 1.24 cm. Therefore, for every one half wavelength, $\lambda/2$, (0.0622 cm) the object moves with respect to the PBS system 100, the phasor will rotate 360°.

The phase measured by the PBS system 100 represents twice the amount of object displacement due to the fact that the reflected signal must travel through both the transmit and receive paths, effectively traveling twice the distance the target is from the antenna. If the object moves one quarter wavelength (90°), then the transmit wave travels 90° with respect to the transmit path, and an additional one quarter wavelength on the receive path after the signal is reflected off the object, yielding a total phase change of λ/2 (180°). Since the phase is detected modulo 360°, the actual distance, or displacement (range) to the object is not known since it may be multiple wavelengths away from the target, but any relative motion can be accurately measured. For example, if the object is at a distance of λ from the PBS system 100, the phasor will be at 0° (twice the 180° phase change). If the object is at a distance of 4λ, the phasor will again be at 0°. In moving from λ to 4λ, the phase has rotated completely around six times before coming to rest again at 0°.

The previous conditions apply only if the transmit wavelength is held constant and the object moves. However, if the object is stationary, and the transmit frequency is changed, then the total phase to the target changes linearly as a function of the transmitted wavelength. For example, if the object is 5 wavelengths away, then the phase output would be at 0 degrees (10 wavelengths total due to transmit and receive paths), since the object is at an integral number of wavelengths. If the transmit frequency is raised by 0.5% (wavelength made shorter by 0.5%), then the new output phase will be at 5.25 wavelengths, which is 10.5 wavelengths of phase change total counting transmit and receiver paths, yielding an output phase of 180 degrees. As the transmit frequency is varied linearly, the rate of phase change will also vary linearly in response and will increase at a larger rate for longer distances.

As the phasor rotates through 360 degrees, the phase must be "unwrapped" so that there are no discrete jumps from 360 to 0 degrees. For example as the phasor moves through two full wavelengths, 360 degrees must be added to the phase output during the second rotation so that the phase varies linearly between 0 and 720 degrees rather than varying between 0 and 360 degrees with a discrete jump as the second revolution begins. Phase unwrapping is often performed via standard mathematical techniques that are included in conventional signal processing and signal analysis software packages. The algorithm may also be implemented in software on SPU 330.

FIG. 9 and FIG. 10 show phasor diagrams, namely a phase change vs. wavelength diagram in FIG. 9 and a frequency plot in FIG. 10. For a given transmitted wavelength, the total distance to the target will yield a phase value (modulo 2 pi) on the phasor diagram. As the distance to the target grows larger, the phase value will move counter-clockwise (increasing phase) on the phasor diagram or vice-versa. For a constant distance (non-moving target), the phase value for a given transmit frequency can then be plotted on the phase vs. frequency diagram. If the wavelength is changed and the distance to the target remains the same, then the standing wave to the target will be at a different phase value with respect to the new transmitted frequency. This will cause a corresponding change in phase of the vector in the phasor diagram and another point can be plotted on the phase vs. frequency graph. This can be continued as the wavelength is changed over some range to yield a phase change vs. frequency graph. Since the rate of phase change is defined to be frequency, the output signal from either the inphase channel or quadrature channel can also be run through a Fast Fourier Transform (FFT) or other frequency measurement technique to derive the rate of phase change. The rate of phase change can then be mathematically related to the distance to the target, as will be shown below.

FIG. 9 provides a representative phasor diagram showing the corresponding change in phase of a vector where a change in wavelength induces a phase change from 330 degrees to 535 degrees. These points can then be plotted on the corresponding phase vs. wavelength plot. From this plot, the slope of the line represents the rate of change of phase as a function of frequency. This slope is directly proportional and can be mathematically related to the total distance to the object by multiplying by a constant as will be shown in future paragraphs. If the signal is bouncing off of the back of the antenna, then the calculated distance can be used to calibrate out changes in cable length. If the signal is bouncing off of the target, then total distance to the target can be calculated.

FIG. 10 represents a phasor diagram illustrating the same change in wavelength and resulting phase change as in FIG. 9. However, in this situation the individual inphase and quadrature channels from the mixers of SPU 310 in FIG. 3 are output as a function of the transmitted wavelength. Since the total phasor can be represented in the standard notation of $A(\cos(\phi(f))+j*\sin(\phi(f)))$, where A is the length of the vector and $\phi$ is the phase that varies as a function of the transmit frequency f; then the inphase term is represented by $A(\cos(\phi(f)))$ and the quadrature term is represented by $A \sin(\phi(f))$. By taking an FFT of one of the output signals, the phase change as a function of frequency can be calculated as well. Higher signal to noise can be gained by performing a complex FFT by using both the inphase and quadrature channels. If there are any additional components present in the output signal due to imperfections in the antenna reflection coefficient, the FFT acts as a group of narrowband frequency filters. The highest peak in the FFT output (not including the first bin, otherwise known as the DC bin) will be the desired phase change frequency. As in the previous figure, the rate of phase change can be directly related to the total distance to the object through multiplication by a constant. If the signal is bouncing off of the back of the antenna, then the calculated distance can be used to calibrate out changes in cable length. If the signal is bouncing off of the target, then total distance to the target can be calculated.

As background material, it is useful to understand how an exemplary PBS system detects motion of a target. When the transmit frequency is held constant and the target being sensed moves in small displacements (less than half a wavelength), the raw output of each of the individual channels of the PBS system 100 (FIG. 3) (e.g., from mixers 450 of the SDU 310 (FIG. 3)) can be composed, for example in a vibration measurement, of the actual vibration frequencies and the additional harmonics. Note that under these conditions with an orthogonally located target there is no classical Doppler effect where the received signal is dependent upon the transmit frequency being used. To show this effect, one can examine the output of one of the mixers 450 (FIG. 4) (either the in-phase or quadrature signal component) of the PBS system 100 for a simple sinusoid motion. Assume in this example, the vibration measurement application, such as that depicted in FIG. 1 or FIG. 2, and further assume that the PBS system 100 has transmitted the following reference signal, x(t), $$x(t)=A \cos(2\pi ft).$$   Eq. 1

Assuming a transmitted amplitude of A (note that A takes into account the transmitted power, antenna gain, and all transmitter losses), a transmit frequency of f, and time, t, in seconds, the received signal (reflected signal) at the first mixer 450 (FIG. 4), y(t), reflected from the targeted object is $$y(t)=B\cos(2\pi ft+\phi(t)+\alpha). \qquad \text{Eq. 2}$$

The received signal (reflected signal) at second mixer 450 (FIG. 4), being offset 90°, will be the above function with cosine replaced by sine. The amplitude B of the received (reflected) signal can be evaluated via the standard radar equation. The time varying phase term $\phi(t)$ represents the change in phase of the received signal due to the motion of the targeted object. This motion is centered around the bias term, $\alpha$. The $\phi(t)$ is a time varying sinusoid representing the motion or variation of the object being examined while the constant, $\alpha$, represents the physical phase difference (range in modulo $2\pi$ radians) between the PBS system 100 and the targeted object. Alpha ($\alpha$) is the phase represented by the total number of complete wavelengths the object is away from the mixers. Therefore, the total distance away is $\alpha+\phi(t)$, where $\phi(t)$ is the "subwavelength" portion of the motion. The signal from the other diode would be y(t) shifted by 90 degrees.

Once the signal has been received at each of the mixers 450 (FIG. 4), the next step is demodulation. The mixers, as indicated above, inherently perform a demodulation, or multiplication, of the reference signal that passes each mixer, and the reflected signal. This multiplication can be represented by conventional trigonometric functions. Looking at the first mixer 450 (FIG. 4), the output of this multiplication can be represented as follows:

$$\begin{aligned}S_1(t) &= [A\cos(2\pi ft) \times B\cos(2\pi ft + \phi(t) + \alpha)] \qquad \text{Eq. 3}\\
&= [AB/2\cos(2\pi ft + 2\pi ft + \phi(t) + \alpha] +\\
&\quad [AB/2\cos(2\pi ft - (2\pi ft + \phi(t) + \alpha))]\\
&= AB/2[\cos(-\phi(t) - \alpha) + AB/2\cos(4\pi ft + \phi(t) + \alpha)]\\
&= AB/2\cos(\phi(t) + \alpha)\end{aligned}$$

(after low-pass filtering out the $4\pi ft$ term).

Using similar trigonometric functions, the output at second mixer 450 (FIG. 4), $S_2(t)=AB/2(\sin(\phi(t)+\alpha))$. Thus, the received signal is mixed with the transmit signal and the double frequency term is filtered out to yield $S_1(t)$, the output of the first mixer 450 of the PBS system 100 (FIG. 3). Using trigonometric identities the equation for $S_1$ becomes:

$$S_1(t)=AB/2((\cos\phi(t))(\cos\alpha)-(\sin\phi(t))(\sin\alpha)). \qquad \text{Eq. 4}$$

For simplicity, let the constant C=AB/2. Next, it can be shown that an oscillation of $f_m$ Hertz (Hz) from the targeted object manifests itself in the output of the PBS system 100 exactly, or substantially, at the same frequency of motion. Let the time varying phase be $$\phi(t)=\beta\sin(2\pi f_m t), \qquad \text{Eq. 5}$$

where $\beta$ corresponds to the maximum phase change (in radians) through which the object moves and can effectively be considered the modulation index as is used in wide-band frequency modulation (FM) analysis. Substituting $\phi(t)$ into equation 4 for $S_1$ yields:

$$S_1(t)=C(\cos(\beta\sin(2\pi f_m t))\cos\alpha-\sin(\beta\sin(2\pi f_m t))\sin\alpha). \qquad \text{Eq. 6}$$

Rewriting $S_1(t)$ in terms of complex exponentials yields $$S_1(t)=C(Re(e^{j\beta\sin(2\pi f_m t)})\cos\alpha-Im(e^{j\beta\sin(2\pi f_m t)})\sin\alpha). \qquad \text{Eq. 7}$$

Next, writing the complex exponentials in terms of standard Fourier series expansions results in the following equation $$S_1(t)=C(Re(\Sigma C_n e^{jn2\pi ft})\cos\alpha-Im(\Sigma C_n e^{jn2\pi ft})\sin\alpha). \qquad \text{Eq. 8}$$

Note that the summations above are from negative infinite to positive infinite. The Fourier coefficients, $c_n$, are $$c_n=f_m\int e^{j\beta\sin(2\pi ft)}e^{-jn2\pi f_m t}dt=J_n(\beta), \qquad \text{Eq. 9}$$

which is an $n^{th}$-order Bessel function of the first kind, where the integration occurs from negative ($\frac{1}{2}$)$f_m$ to positive ($\frac{1}{2}$)$f_m$. Substituting this result into equation 8 generates:

$$\begin{aligned}S_1(t) &= C\big(Re\big(\sum J_n(\beta)e^{jn2\pi ft}\big)\cos\alpha - Im\big(\sum J_n(\beta)e^{jn2\pi ft}\big)\sin\alpha\big) \qquad \text{Eq. 10}\\
&= C\big(\sum J_n(\beta)\cos(2\pi nf_m t)\cos\alpha - \sum J_n(\beta)\sin(2\pi nf_m t)\sin\alpha\big).\end{aligned}$$

Finally, using the trigonometric angle-sum relationship the following relationship can be obtained $$S_1(t)=C\Sigma J_n(\beta)\cos(2\pi nf_m t+\alpha). \qquad \text{Eq. 11}$$

From Eq. 11 it can be seen that when the PBS system 100 is interrogating a targeted object oscillating at a single frequency, the output is the sum of the vibration fundamental frequency as well as harmonically related sinusoids whose amplitude is determined by the $n^{th}$-order Bessel function of the first kind. For an index of n=0, the DC offset of the signal is determined by the bias consent, $\alpha$. It is this bias constant that determines the amount of harmonic content contained in the signal.

This suggests that a single mixer is capable of receiving vibration signals; however, there is the potential for significant harmonic distortion depending on the value of $\alpha$. The output of a single mixer has a plurality of harmonics, and therefore is not an accurate representation of the motion of the object being interrogated (i.e. sensed). Note, as described above, that this is the output of a single mixer using either the in-phase or quadrature mixer signal. The mixer outputs can be combined, in an exemplary embodiment, to produce an output that can eliminate the harmonic content. The output of the second mixer 450 (FIG. 4) is:

$$S_2(t)=C\Sigma J_n(\beta)\sin(2\pi nf_m t+\alpha). \qquad \text{Eq. 12}$$

These two signals, $S_1(t)$ and $S_2(t)$, can be recombined using complex exponentials and trigonometric identifies to form the desired output, $\phi(t)$ plus the bias term, $\alpha$, as follows:

$$\begin{aligned}\tan^{-1}(s2(t)/s1(t)) &= \big[C\sum J_n(\beta)\sin(2\pi nf_m t+\alpha)\big]/ \qquad \text{Eq. 13}\\
&\quad \big[C\sum J_n(\beta)\cos(2\pi nf_m t+\alpha)\big]\\
&= \beta\sin(2\pi f_m t)+\alpha.\end{aligned}$$

The resulting phase, $\beta\sin(2\pi f_m t)+\alpha$, exactly, or substantially, represents the vibration of the object. Therefore, the PBS system 100 is capable of sensing the actual phase change due to the vibration, without distortion from harmonic content, and acts as a highly tuned displacement sensor since the phase can be directly converted into distance when the system has been calibrated, the transmit frequency is known, and the movement is less than a wavelength, or the initial distance to object is known. While the representative example of vibration of an object as discussed in connection with Eq. 13, those of skill in the art will appreciate that the PBS system also can sense the phase change arising from other environmental effects, such as temperature changes or motion vibrations.

The mixers 450 (FIG. 4) produce in-phase and quadrature radar signals that are preferably exactly 90 degrees out of phase with respect to one another. In addition, it is preferable that the gains of the signals from the two mixers are exactly or almost exactly matched. In a typical implementation using known components, manufacturing tolerances make it difficult for the mixers to be ideally matched and/or spatially separated, and therefore, the system can suffer from non-linearities, which degrade the measurements. Another aspect of the preferred embodiment of the invention is the ability to "fix" this non-linear condition, in both the displacement sensing and calibration modes of the system. This can be done mathematically by applying the following transformations to the outputs of the PBS system 100. Given a signal z(t) composed of the in-phase signal, x(t), and quadrature signal, y(t), the following equation can be provided:

$$z(t)=x(t)+i*y(t).$$ Eq. 14

Now, let the phase mismatch between signals x(t) and y(t) be $\emptyset^1$ and the amplitude mismatch be $\epsilon$. Then, x(t) can be defined as the reference, and y(t) can be transformed to be precisely 90 degrees out of phase and balanced in amplitude with x(t) using the following transformation. The new signal y'(t) is defined to be $$y'(t)=\tan(\emptyset^1)*x(t)=1/(1+\epsilon)\cos(\emptyset^1)*y(t).$$ Eq. 15

Practically, this can be performed in the digital domain according to mechanisms well-known in the art once the differences between the two signals have been measured.

A description of the innovative calibration technique can also be described mathematically. The received phase of the vector, $\phi$, can be calculated by the following equation where x is the distance from SDU 310 (FIG. 3) to the object being measured and $\lambda$ is the transmitted signal wavelength.

$$\phi = 2\pi\left(\frac{2x}{\lambda}\right)$$ Eq. 16

Note that the distance is multiplied by two because the radar wave must travel out to the target, and then be reflected back to the sensor, which means it must travel twice the total distance to the target. When the object is more that one half wavelength away, the phase could be at any multiple of 360 degrees. The actual phase measured in the sensor can only be between 0 and 360 degrees, meaning that the output of the sensor is modulo 360 degrees. If the target is located at a phase more than 360 degrees away, there is an ambiguity as to the actual location of the target.

If the object itself begins to move, the change in displacement is directly proportional to the change in phase of the vector, which is modeled by the following equation.

$$\Delta\phi = 2\pi\left(\frac{2\Delta x}{\lambda}\right)$$ Eq. 17

When the wavelength is known, the change in displacement can be directly calculated from the equation. The equation can also be rewritten showing how the ratio of the change in phase is related to the change in displacement over the transmitted wavelength.

$$\frac{\Delta\phi}{2\pi} = \frac{2\Delta x}{\lambda}$$ Eq. 18

Note that if the displacement is held constant (target is stationary), a change in the transmitted wavelength can vary the phase as well. This feature can be exploited to calculate the total number of wavelengths to the object being measured. Absolute position can then be found through simply changing the transmitted wavelength and examining the corresponding output change in phase, as will be shown shortly.

Note that frequency modulated continuous wave (FMCW) radar also performs a similar type of change in the transmit frequency (frequency modulation). However, FMCW techniques use the frequency modulation as a "time stamp" and the technique can be shown to be a time of flight measurement. The techniques described here are using phase changes due to the change in length of the transmitted wave. In FMCW techniques, the location in frequency space where a target appears is dependant upon the slope (frequency bandwidth divided by the time period) of the modulating waveform. The particular technique described herein is independent of the rate at which the carrier frequency is swept and thus is not a time of flight technique.

If it is assumed that the transmitting frequency with an initial wavelength, $\lambda_0$, we can define the distance to a single target, x, in terms of the number of wavelengths, $n_0$.

$$n_0 = \frac{x}{\lambda_0}$$ Eq. 19

If the transmit frequency changes, the total number of wavelengths, $n_0$, that it takes to reach the target changes (note that $n_0$ does not necessarily have to be an integer, it defines the total distance to the target in terms of wavelengths—such 1.32 wavelengths). The new number of wavelengths, $n_1$, can be found by scaling the original number of wavelengths, $n_0$, by the percentage increase (or decrease) in the wavelength.

$$n_1 = n_0\left(1 + \frac{\lambda_0 - \lambda_1}{\lambda_0}\right)$$ Eq. 20

An example of this concept is shown in FIG. 11. Assume the object is located on the right hand side of the graph at 1 meter and the antenna is located on the left at 0 meters. The first transmitted frequency, $f_0$, has a wavelength of 0.25 meters. The number of wavelengths, $n_0$, to the target is 4. The transmit frequency is changed to $f_1$, which has a length of 0.2353 meters, a 6.25% decrease in the wavelength size, and a corresponding increase in the number of wavelengths to the target. Plugging these numbers into Eq. 20 yields the total number of wavelengths, $n_1$, to be 4.25.

Note that the phase at which the target is located will change with respect to the new transmitted frequency. Also, note that the change in phase for a target located within a single wavelength or less is uniquely defined, because only the wavelength has changed. For example, if the target was located exactly one wavelength away, and the wavelength was increased by decreased by 25%, then the phase of the target, which was at 0 degrees would now be at 90 degrees. Given that the target is within a single wavelength of the sensor, the new phase of the phasor, $\theta_1$, can be calculated given the initial wavelength, $\lambda_0$, the new wavelength, $\lambda_1$, and the initial phase $\theta_1$ by the following equation.

$$\theta_1 = \theta_0 + 2\pi\left(\frac{\lambda_0 - \lambda_1}{\lambda_0}\right) \qquad \text{Eq. 21}$$

The difference in phase caused by transmitting the second frequency can be found be subtracting out the initial phase as shown in the following equation.

$$\theta_1 - \theta_0 = 2\pi\left(\frac{\lambda_0 - \lambda_1}{\lambda_0}\right) \qquad \text{Eq. 22}$$

Now, if the target was not within a single wavelength, but was located multiple wavelengths away, the difference in phase can be found simply by multiplying the term on the right hand side of Eq. 22 by the number of wavelengths at the initial frequency, $n_0$, as shown in the following equation. Equation Eq. 22 is just a special case of Eq. 23 where $n_0$, is 1.

$$\theta_1 - \theta_0 = 2\pi\left(\frac{\lambda_0 - \lambda_1}{\lambda_0}\right)n_0 \qquad \text{Eq. 23}$$

When measuring the phase change at the radar, the distance is actually double the distance to the target, because the radar wave must propagate out, hit the target, and then propagate back to the receiver. Therefore, the number of wavelengths as measured by PBS system 100 is double the actual distance, as shown in the following equation.

$$\theta_1 - \theta_0 = 2\pi\left(\frac{\lambda_0 - \lambda_1}{\lambda_0}\right)2n_0 \qquad \text{Eq. 24}$$

Eq. 24 can be generalized further showing that a change in the transmit frequency, $\Delta\lambda$, manifests itself as a change in the phase, $\Delta\theta$.

$$\Delta\theta = 2\pi\left(\frac{-\Delta\lambda}{\lambda_0}\right)2n_0 \qquad \text{Eq. 25}$$

Eq. 25 can be rearranged to solve for $n_0$ to obtain the final desired result.

$$n_0 = -\left(\frac{\Delta\theta}{\Delta\lambda}\right)\frac{\lambda_0}{4\pi} \qquad \text{Eq. 26}$$

This equation shows that the absolute distance to the target or antenna can be measured, in terms of the number of wavelengths, by changing the frequency and observing the corresponding change in the phase of the received vector.

Also, rather than taking data at two discrete frequency points, the first term consisting of the change in phase over the change in wavelength can be accurately calculated by measuring the slope of an unwrapped phase vs. transmit frequency plot. A line could easily be fit to the resulting graph to obtain a high quality estimate of the slope to be substituted into Eq. 26. The only requirement is that at least two points must be collected for every 360 degrees of rotation of the vector to ensure there are no ambiguities.

Assume that the VCO sweep is performed over some bandwidth and moved in discrete steps, where $\lambda_l$ is the lowest wavelength of the sweep and $\lambda_h$ is the highest wavelength of the sweep, then the total distance to the target, d, can be found by using Eq. 26 and the phase rate of change slope (average change in phase over change in wavelength), as $$d = -\left(\frac{\Delta\theta}{\Delta\lambda}\right)\frac{\lambda_l\lambda_h}{4\pi} \qquad \text{Eq. 27}$$

Although $n_0$ will give the total displacement to the object, rounding $n_0$ down to the nearest integer which will give the total integral number of wavelengths to the object. When this is combined with other relative displacement techniques that only measure displacement within a single wavelength, this technique can be used to calibrate the initial displacement of the object after which other relative displacement measurement techniques would be used to get a more accurate estimate. If the VCO is tuned out of the center band of the antenna, then the object can be used to calibrate the cable length from the sensor to the back of the antenna. If the object is in a vibratory motion, where the phase change is small compared to the total phase change from the sensor to the object, then the technique is still valid to find the average distance to the object. Vibratory motion would simply add a sinusoidal oscillation around the straight line on the phase change vs. frequency plot. By fitting a line to the resulting data, the mean distance to the object (center line about which the object is vibrating) would be found without any loss of generality.

The above described derivation can be presented as part of the operating process shown in FIG. 12, the exemplary calibration process performed by the SPU 330 (FIG. 3), as shown in FIG. 13, and an alternative calibration process performed by the SPU 330, as shown in FIG. 14. In general, as described above, the PBS system 100 sweeps the transmit frequency to measure the total length to the reflected object which is the output of the PBS system 100 in the calibration mode. The PBS logic of the SPU 330 provides a measurement of the actual distance to an object (sensed, or targeted) relative to the mixers of the SDU 310 (FIG. 3). The PBS logic enables absolute measurement to calibrate out cable lengths or can measure the absolute distance to the target depending upon where in the antenna frequency response the transmit frequency is swept.

FIG. 12 is a process diagram showing the an exemplary steps for the set-up, calibration, and operation tasks of a PBS system. Referring to the flowchart of FIG. 12, step 1210 includes mounting the PBS system near the object to be measured such that the cable can reach the access port for the antenna. Step 1220 includes mounting the antenna in such a way so that the antenna surface placed parallel to the surface to be measured. Step 1230 includes connecting the microwave propagating medium, such as a cable or waveguide, between the antenna and the PBS system 100. Step 1240 is the calibration process for measuring the distance to the antenna, which is implemented by either of the two embodiments illustrated in FIG. 13 and FIG. 14. Step 1250 includes performing the calibration process to measure the distance to the target, which can be implemented by either of the two embodiments shown in FIG. 13 and FIG. 14.

The process of steps 1240 and 1250 operates exactly the same no matter if the calibration distance is being calculated to the antenna or the target. The only difference between steps 1240 and 1250 is what bandwidth the signal is swept over. As was shown in FIGS. 5A and 5B, the signal can be selectively bounced off of the antenna or off of the target depending on the transmit frequency. If the transmit frequency is swept within the antenna passband, then the signal passes through the antenna and is reflected back by the target. If the transmit frequency is within the stopband of the antenna or by a filter with a similar frequency response physically located at the antenna, then the signal is reflected off of the antenna.

Step 1260 includes subtracting the total length to the target from the total length to the cable to obtain the initial distance from the antenna to the target. Step 1270 includes performing relative displacement calculations of the target, as was described in Eq. 1–13 and disclosed in more detail below in connection with FIG. 15. Step 1280 includes performing the calibration task again, which can be implemented by either of the two embodiments illustrated in FIG. 13 and FIG. 14, based on an update schedule for the PBS system. Calibration can be completed on a regular, irregular, or periodic basis. For example, calibration is typically completed at least several times per day or whenever significant environmental changes occur. If there is any significant temperature change, the length of the cable changes due to thermal expansion and contraction, and the system should be recalibrated as soon as possible. Typical calibration times may be on the order of once an hour for a typical installation in an industrial setting or whenever a change of more than a few degrees in temperature occurs since the last calibration was performed. Steps 1270 and 1280 are typically repeated during normal operation of an exemplary PBS system.

The exemplary tasks completed by a PBS system, as illustrated in FIG. 12, can be grouped into different task categories, namely the tasks of set-up, calibration, and system operation. Steps 1210, 1220, and 1230 can be view as set-up tasks for the exemplary PBS system. An initial calibration task for the PBS system can be completed by performing steps 1240, 1250, and 1260 of FIG. 12. A representative operational task of the exemplary PBS system is performed in step 1270 of FIG. 12. The initial calibration calculation can be updated by completing step 1280 of the process diagram illustrated in FIG. 12.

Referring to the flowchart of FIG. 13, step 1310 includes measuring the amplitude at two mixers that are offset in phase whose amplitudes are a ratio relating the phase difference between the transmitted and received signal. (See Eq. 28). Step 1320 includes calculating the arctangent of the ration in amplitude between the two mixers to derive a phase value modulo 2 pi. (See Eq. 13) Step 1330 includes storing the phase measurement. Step 1340 includes changing the transmitted wavelength by an amount, thereby changing the total phase to the target, that would cause a change of less than 180 degrees as described in Eq. 26. (See also Eq. 21) Steps 1310 through 1340 are repeated until the VCO sweeps through the desired bandwidth. Once the VCO is done sweeping, Step 1350 includes performing standard phase unwrapping on the stored measurements. Step 1360 includes calculating the slope of the phase vs. wavelength graph. Any standard slope measurement techniques such as derivatives, and least mean square line fits are appropriate for this step. (See Eq. 27) Step 1370 includes multiplying the slope by the ratio of the longest wavelength in the sweep divided by the shortest wavelength in the sweep with the entire result divided by 4 pi. (See Eq. 27) The resultant is the output of length of the object being measured, which will be the distance to the back of the antenna or to the target.

The flow chart of FIG. 13 shows the architecture, functionality, and operation of an exemplary implementation of the operating software (herein PBS logic, as described below) of the SPU 330 to perform calibration. In this regard, each block represents a module, segment, or portion of code, which comprises one or more executable instructions for implementing the specified logical function(s). It should also be noted that in some alternative implementations, the functions noted in the blocks may occur out of the order noted in FIG. 13. For example, two blocks shown in succession in FIG. 13 may in fact be executed substantially concurrently or the blocks may sometimes be executed in the reverse order, depending upon the functionality involved.

Since the calibration technique is calculating a phase rate of change, and frequency is the derivative of phase, the algorithm can be viewed in an alternate embodiment as estimating the frequency of sinusoid at the output of mixers 450 due the VCO sweep and multiplying the estimated frequency by a constant. A standard method of frequency estimation is by utilizing a Fast Fourier Transform (FFT), however, any other method of estimating frequency can be used as part of this algorithm, which may include eigenvalue decomposition techniques such as the MUSIC algorithm, and zero crossing methods.

Assuming the condition where an FFT is used on sampled data from the mixers, the frequency estimation can be performed on several different data sets. Since the inphase and quadrature signal are the sine and cosine, respectively, of the rotating phasor, either the inphase or quadrature channels can be used individually to pass to the frequency estimation algorithm. However, a 3 dB increase in signal to noise can be achieved by combining the inphase, i(t) and quadrature, q(t) signals into a single complex signal, x(t) and then performing a complex FFT as is shown in Eq. 28.

$$x(t)=i(t)+jq(t) \qquad \text{Eq. 28}$$

Once an FFT is taken of the data, the highest frequency component that is not the DC term will be the rate of phase change. The next step is to normalize the detected output frequency, $f_{max}$, in terms of the Nyquist sampling frequency, given an N pt. FFT and a maximum frequency detected in bin I as is shown in Eq. 29.

$$f_{max} = \frac{2I}{N} \qquad \text{Eq. 29}$$

Since the measured frequency is proportional to the distance to the target, the frequency axis can be scaled in terms of displacement as well. The Nyquist rate in terms of distance can be calculated and then multiplied by the normalized frequency, $f_{max}$, to obtain the total distance.

The "sampling" frequency for this particular condition is the change in wavelength as the VCO is swept through the bandwidth. Therefore, the Nyquist rate will be exceeded when the change in wavelength induces a change in phase greater than $\pi$ radians. Given an initial number of wavelengths to the target for the first frequency, $n_0$ and a second number of wavelengths to the target for the second frequency point, $n_1$ the maximum change in phase between the data points is shown in Eq. 30.

$$2\pi(n_0-n_1) \leq \pi \qquad \text{Eq. 30}$$

Therefore, given the total distance that can be sensed, $x_{max}$, to the target before the Nyquist condition is reached will be $$2\pi\left(\frac{2x_{max}}{\lambda_0} - \frac{2x_{max}}{\lambda_1}\right) = \pi \qquad \text{Eq. 31}$$

Solving Eq. 31 for the Nyquist displacement x yields $$x_{max} = \frac{\lambda_0 \lambda_1}{4(\lambda_1 - \lambda_0)} \qquad \text{Eq. 32}$$

Eq. 32 can be rewritten in terms of the highest transmitted frequency, $f_{high}$, lowest transmitted frequency, $f_{high}$, and number of points across the sweep, J.

$$x_{max} = \frac{J(3*10^8)}{4(f_{high} - f_{low})} \qquad \text{Eq. 33}$$

Therefore, the final distance to the target, d, can be achieved by multiplying Eq. 29 by Eq. 33.

$$d = \frac{I*J(3*10^8)}{N(f_{high} - f_{low})} \qquad \text{Eq. 34}$$

Referring to the flowchart of FIG. 14, step 1310 includes measuring the amplitude at two mixers that are offset in phase whose amplitudes are a ratio relating the phase difference between the transmitted and received signal. (See Eq. 28) Step 1430 includes storing the amplitude data from each of the two mixers. Step 1440 includes changing the transmitted wavelength by an amount less than the Nyquist rate described previously to change the total phase to the target. (See Eq. 21) Steps 1310, 1430, and 1440 are repeated until the VCO sweeps through the desired bandwidth. Once the VCO is done sweeping, Step 1450 includes performing a complex FFT on the stored amplitude data from the two mixers and determining the frequency bin with the largest amplitude that is not DC. Note that in this step, an FFT can be performed on either of the two mixer signals individually with the end result only being a decrease in the signal to noise ratio. (See Eq. 29) Step 1460 includes finding the total distance to the target by multiplying the largest frequency component (normalized to 1 by the Nyquist rate) and multiplying by the change in wavelength performed in 1440 and dividing by 4, as shown in Eq. 34.

The flow chart of FIG. 14 shows the architecture, functionality, and operation of a possible implementation of the calibration operating software (herein PBS logic, as described below) of the SPU 330. In this regard, each block represents a module, segment, or portion of code, which comprises one or more executable instructions for implementing the specified logical function(s). It should also be noted that in some alternative implementations, the functions noted in the blocks may occur out of the order noted in FIG. 14. For example, two blocks shown in succession in FIG. 14 may in fact be executed substantially concurrently or the blocks may sometimes be executed in the reverse order, depending upon the functionality involved.

Once the calibration described in FIG. 13 and FIG. 14 is complete, subtracting the distance from the target to the end antenna, as is shown in 1260, yields an estimate of the distance from the antenna to the target. Any changes in length of the cable due to temperature or mechanical effects (such as cable bending) will cause a constant error to appear in the sensor output. When accuracy of several thousandths of an inch is desired, it is difficult to decouple sensor error from actual target motion. Therefore, the calibration technique described is able to remove the DC drift from the output signal and adaptively correct for any errors.

Also, it should be noted that in particular sensor implementations it may be desirable to measure only the length to the back of the antenna or only to the target. This may be the case when the target geometry is rapidly changing, or when only cable length changes need to be tracked. The calibration algorithm of FIGS. 13 and 14 may be applied to either case individually with no loss of generality.

FIG. 15 is a flowchart showing an exemplary implementation of displacement calculations, which are completed in Step 1270 of FIG. 12. The displacement sensing function of Step 1270 in FIG. 12 is also disclosed in U.S. Pat. No. 6,489,917. Referring to the flowchart of FIG. 15, step 1510 includes measuring the amplitude of a reference signal multiplied by a reflected signal at two detectors 450 that are offset in phase by 90 degrees. Eq. 3 shows the output of one channel. The output of the second channel 90 degrees out of phase would be Eq. 3 with the cosine term replaced by a sine term. Step 1520 calculates the phase of the phasor, $\phi$, by determining the arctangent of the quadrature signal 480 divided by the inphase signal 470 as is shown in Eq. 35.

$$\phi = \arctan\left(\frac{\text{Quadrature}}{\text{Inphase}}\right) \qquad (35)$$

The output phase of Step 1530 can be related to the actual target displacement, x, in Step 1530 by multiplying the phase value by the wavelength divided by 4 pi as is shown in Eq. 36.

$$x = \frac{\phi}{4\pi} \qquad (36)$$

The displacement measurement can be repeated as often as necessary depending on how often the target is expected to change. In the case of measuring turbine engine blades, the measurement may be updated as often as 25 million times per second (25 MHz). In process control applications were displacements may be smaller, typical update rates of 40,000 times per second (40 kHz) would be performed.

In view of the foregoing, it will be appreciated that the present invention provides method for obtaining a distance to a target by use of a sensing system comprising a signal source, an antenna, and two or more detectors, comprising the steps of:

(a) transmitting transmit signals for transmission via the antenna and corresponding reference signals to the detectors in response to sweeping in selected frequency increments a frequency band of the signal source;

(b) receiving received signals via the antenna, each received signal representing a reflection of one of the transmit signals off of the target;

(c) identifying a rate of change of phase between the reference signals and the received signals as detected by the detectors; and (d) calculating the distance to the target based on the rate of change of phase as a function of frequency between the reference signals and the received signals.

In addition, the present invention provides a phase-based radar system useful for obtaining a distance to a target, comprising:

a signal source operative to generate transmit signals for transmission and corresponding reference signals in response to sweeping in selected frequency increments a frequency band of the signal source;

an antenna, functionally coupled to the signal source, for transmitting the transmit signals and receiving received signals, wherein each received signal represents a reflection of one of the transmit signals off of the target;

two or more detectors, functionally coupled to the antenna and to the signal source, for detecting the received signals and the reference signals; and a processor operative to identify a rate of change of phase between the reference signals and the received signals as detected by the at least pair of detectors, the processor further operative to calculate the distance to the target based on the rate of change of phase as a function of phase between the reference signals and the received signals.

It should be emphasized that the above-described embodiments of the present invention are possible examples of implementations, merely set forth to provide a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for obtaining a distance to a target by use of a sensing system comprising a signal source, an antenna, and at least a pair of detectors, comprising the steps of:

(a) transmitting a plurality of transmit signals for transmission via the antenna and a plurality of corresponding reference signals for distribution to the at least pair of detectors in response to sweeping in selected frequency increments a frequency band of the signal source;

(b) receiving a plurality of received signals via the antenna, each received signal representing a reflection of one of the transmit signals off of the target;

(c) identifying a rate of change of phase between the reference signals and the received signals as detected by the at least pair of detectors; and (d) calculating the distance to the target based on the rate of change of phase as a function of frequency between the reference signals;

wherein a propagation medium connects the signal source to the antenna, the frequency band comprises the stopband of the antenna, the target comprises the antenna, and the distance to the target comprises the length of the propagation medium and the received signals.

2. The method of claim 1, wherein the at least pair of detectors are offset in phase.

3. The method of claim 1, wherein the frequency band comprises the stopband of the antenna and the target comprises the antenna.

4. The method of claim 1, wherein the frequency band comprises the passband of the antenna, the target comprises an item within the operating environment of the sensing system, and the distance to the target comprises a distance between the item and the signal source.

5. The method of claim 1, further comprising the step of calibrating the sensing system by:

(i) performing steps (a), (b), (c) and (d) to complete a first calibration measurement, wherein a propagation medium connects the signal source to the antenna, the frequency band comprises the stopband of the antenna, the target comprises the antenna, and the distance to the target comprises the length of the propagation medium;

(ii) performing steps (a), (b), (c) and (d) to complete a second calibration measurement, wherein the frequency band comprises the passband of the antenna, the target comprises an item within the operating environment of the sensing system, and the distance to the target comprises a distance between the item and the signal source, and completing steps; and (iii) subtracting the first calibration measurement from the second calibration measurement, thereby removing environmental effects associated with the propagation medium from operation of the sensing system.

6. The method of claim 5, further comprising repeating steps (i), (ii) and (iii) at predetermined times during operation of the sensing system to maintain calibrated operation of the sensing system.

7. A phase-based radar system useful for obtaining a distance to a target comprising:

a signal source operative to generate a plurality of transmit signals and a plurality of corresponding reference signals in response to sweeping in selected frequency increments a frequency band of the signal source;

an antenna, functionally coupled to the signal source, for transmitting the transmit signals and receiving a plurality of received signals, wherein each received signal represents a reflection of one of the transmit signals off of the target;

at least a pair of detectors, functionally coupled to the antenna and to the signal source, for detecting the received signals and the reference signals; and a processor operative to identify a rate of change of phase between the reference signals and the received signals as detected by the at least pair of detectors, the processor further operative to calculate the distance to the target based on the rate of change of phase as a function of frequency between the reference signals and the received signals, wherein a propagation medium connects the signal source to the antenna, the frequency band comprises the stopband of the antenna, the target comprises the antenna, and the distance to the target comprises the length of the propagation medium.

8. The system of claim 7, wherein the at least pair of detectors are offset in phase.

9. The system of claim 7, wherein the frequency band comprises the stopband of the antenna and the target comprises the antenna.

10. The system of claim 7, wherein the frequency band comprises the passband of the antenna, the target comprises an item within the operating environment of the phase-based radar system, and the distance to the target comprises a distance between the item and the signal source.

11. A computer-implemented method for calibrating a phase-based radar system useful for obtaining a distance to a target, the phase-based radar system comprising a signal source, an antenna and at least a pair of detectors, comprising the steps of:

(a) identifying a length of a propagation medium to the antenna by:

transmitting a plurality of transmit signal to the antenna via the propagation medium and a plurality of corresponding reference signals for detection by the at least pair of detectors in response to sweeping in selected frequency increments the signal source within a stopband of the antenna, receiving a plurality of received signals from the antenna via the propagation medium, each of the received signals representing a reflection of one of the transmit signals off of the antenna, determining a rate of change of phase between the reference signals and the received signals as detected by the at least pair of detectors, and calculating a distance from the signal source to the antenna based on the rate of change of phase as a function of frequency between the reference signals and the received signals;

(b) identifying the distance to the target by:

transmitting a plurality of transmit signals to the antenna via the propagation medium and a plurality of corresponding reference signals for detection by the at least pair of detectors in response to sweeping in selected frequency increments the signal source within a passband of the antenna, receiving a plurality of received signals from the antenna via the propagation medium, each of the received signals representing a reflection of one of the transmit signals off of the target, determining a rate of change of phase between the reference signals and the received signals as detected by the at least pair of detectors, and calculating the distance to the target based on the rate of change of phase as a function of frequency between the reference signals and the received signals; and (c) completing a calibration of the phase-based radar system by subtracting the length of the propagation medium from the distance to the target to obtain a distance between the antenna and the target.

12. The computer-implemented method of claim 11, further comprising the step of repeating steps (a), (b) and (c) at predetermined times during operation of the phase-based radar system to maintain calibrated operation of the phase-based radar system.

13. A computer-implemented method for obtaining a distance to a target by use of a phase-based radar system comprising a signal source, at least a pair of detectors offset in phase, and an antenna, comprising the steps of:

(a) transmitting a transmit signal for transmission via the antenna and a corresponding reference signal at a transmit frequency within a predetermined frequency band of the signal source;

(b) receiving a received signal via the antenna, the received signal representing a reflection of the transmit signal from the target;

(c) measuring an amplitude level for the received signal and the reference signal at each of the least pair of detectors, each amplitude level representing a phase difference between the reference signal and the received signal, and storing each amplitude level in a memory storage device to maintain a record of stored amplitude data;

(d) changing the transmit frequency to another transmit frequency within the predetermined frequency band and repeating steps (a), (b) and (c), the other transmit frequency representing an incremental change in the transmit frequency;

(e) repeating step (d) until the predetermined frequency band of the signal source is swept;

(f) calculating a complex Fast Fourier Transform (FET) for the stored amplitude data; and (g) calculating the distance to the target by identifying a peak frequency, normalized by the Nyquist rate, for the complex FFT, multiplying the peak frequency by the incremental change in the transmit frequency to derive a target result, and dividing the target result by a constant value.

14. The method of claim 13, wherein the incremental change in the transmit frequency results in less than pi radians of total phase change between the reference signals and the received signals detected by the at least pair of detectors.

15. The method of claim 13, wherein the constant value comprises a value of 4 pi.

16. A computer-implemented method for obtaining a distance to a target by use of a phase-based radar system comprising a signal source, a pair of detectors offset in phase, and an antenna, comprising the steps of:

(a) transmitting a transmit signal for transmission via the antenna and a corresponding reference signal at a transmit frequency within a predetermined frequency band of the signal source;

(b) receiving a received signal via the antenna, the received signal representing a reflection of the transmit signal from the target;

(c) measuring an amplitude level for the received signal and the reference signal at each of the detectors, each amplitude level representing a phase difference between the reference signal and the received signal, deriving a phase value by calculating the arctangent of a ratio of the amplitude level measured at each of the detectors, and storing the phase value in a memory storage device to maintain a record of stored phase measurements;

(d) changing the transmit frequency to another transmit frequency within the predetermined frequency band and repeating steps (a), (b) and (c), the other transmit frequency representing an incremental change in the transmit frequency;

(e) repeating step (d) until the predetermined frequency band of the signal source is swept;

(f) determining unwrapped phase values by completing phase unwrapping of the stored phase measurements;

(g) calculating a slope of a line derived from a comparison of the unwrapped phase values to the wavelength for each transmit frequency in step (d); and (h) calculating the distance to the target by multiplying the slope by a ratio of the longest wavelength in step (g) to the shortest wavelength in step (g) to derive a target result and dividing the target result by a constant value.

17. The method of claim 16, wherein the incremental change in the transmit frequency results in less than pi radians of total phase change between the reference signals and the received signals detected at the at least pair of detectors.

18. The method of claim 16, wherein the constant value comprises a value of 4 pi.

* * * * *